(12) United States Patent
Park et al.

(10) Patent No.: US 10,572,732 B2
(45) Date of Patent: Feb. 25, 2020

(54) METHOD, STORAGE MEDIUM AND ELECTRONIC APPARATUS FOR PROVIDING SERVICE ASSOCIATED WITH IMAGE

(71) Applicant: Samsung Electronics Co., Ltd., Suwon-si, Gyeonggi-do (KR)

(72) Inventors: An-Na Park, Suwon-si (KR); Byung-Jun Son, Seoul (KR); Soo-Wan Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 15/380,296

(22) Filed: Dec. 15, 2016

(65) Prior Publication Data

US 2017/0169295 A1 Jun. 15, 2017

(30) Foreign Application Priority Data

Dec. 15, 2015 (KR) .......................... 10-2015-0179155

(51) Int. Cl.
*G06K 9/00* (2006.01)
(52) U.S. Cl.
CPC .............................. *G06K 9/00671* (2013.01)
(58) Field of Classification Search
None
See application file for complete search history.

(56) References Cited

U.S. PATENT DOCUMENTS

| 6,917,384 | B1* | 7/2005 | Fukushima | ............ | H04N 1/215 |
| | | | | | 348/222.1 |
| 8,780,226 | B2 | 7/2014 | Nakamura et al. | | |
| 9,830,631 | B1* | 11/2017 | Dhua | .................. | G06K 9/6202 |
| 2004/0125877 | A1 | 7/2004 | Chang et al. | | |
| 2010/0333020 | A1 | 12/2010 | Jeong et al. | | |
| 2011/0279683 | A1 | 11/2011 | Yarmchuk et al. | | |
| 2012/0281107 | A1* | 11/2012 | Sugimoto | ................ | H04N 5/14 |
| | | | | | 348/222.1 |
| 2013/0027551 | A1 | 1/2013 | Peleg et al. | | |
| 2013/0050747 | A1* | 2/2013 | Cok | ................... | H04N 1/00167 |
| | | | | | 358/1.15 |
| 2013/0250131 | A1 | 9/2013 | Yamaji et al. | | |
| 2014/0357280 | A1 | 12/2014 | Rao et al. | | |
| 2015/0271413 | A1 | 9/2015 | Kuo | | |
| 2016/0295125 | A1* | 10/2016 | Osawa | ............... | H04N 5/23296 |

FOREIGN PATENT DOCUMENTS

WO 2014-021566 A1 2/2014

* cited by examiner

*Primary Examiner* — Wei Wen Yang
(74) *Attorney, Agent, or Firm* — Jefferson IP Law, LLP

(57) ABSTRACT

An electronic apparatus for providing a service associated with images is provided. The electronic apparatus includes a memory, and a processor configured to acquire multiple images, acquire information associated with at least one of the multiple images, classify at least some of the multiple images into at least one group based on the information associated with the at least one of the multiple images, and provide a service based on information of the classification of the at least some of the multiple images.

18 Claims, 25 Drawing Sheets

| | Title | Score |
|---|---|---|
| 2638 | Photo taken alone on good weather day in the spring of last year | 8 |
| 2636 | Photo taken alone on good weather day last year | 6 |
| 2634 | Photo taken alone last spring | 5 |
| 2632 | Photo taken alone last year | 3 |
| | Title Ranking & Selection | |

METHOD, STORAGE MEDIUM AND ELECTRONIC APPARATUS FOR PROVIDING SERVICE ASSOCIATED WITH IMAGE

CROSS-REFERENCE TO RELATED APPLICATION(S)

This application claims the benefit under 35 U.S.C. § 119(a) of a Korean patent application filed on Dec. 15, 2015 in the Korean Intellectual Property Office and assigned Serial number 10-2015-0179155, the entire disclosure of which is hereby incorporated by reference.

TECHNICAL FIELD

The present disclosure relates to a method and electronic apparatus for providing a service/function associated with images.

BACKGROUND

The electronic apparatus may include a camera, process images taken through the camera, compress the processed image to generate an image file, and store the generated image file in a memory according to the related art.

In addition, the electronic apparatus may periodically photograph images and generate a story album using the photographed images according to a user's input according to the related art.

The above information is presented as background information only to assist with an understanding of the present disclosure. No determination has been made, and no assertion is made, as to whether any of the above might be applicable as prior art with regard to the present disclosure.

SUMMARY

The electronic apparatus requires periodic photographing according to the related art, and manual input by the user or the like at a time of production of a life-log or a story album, and therefore, a large amount of memory/operational resources is wasted, and efficient and convenient life-logging and production of story albums are difficult.

Aspects of the present disclosure are to address at least the above-mentioned problems and/or disadvantages and to provide at least the advantages described below. Accordingly, an aspect of the present disclosure is to provide an apparatus and method for providing a service associated with an image.

In accordance with an aspect of the present disclosure, an electronic apparatus for providing a service associated with images is provided. The electronic apparatus includes a memory, and a processor configured to acquire multiple images, acquire information associated with at least one of the multiple images, classify at least some of the multiple images into at least one group based on the information associated with the at least one of the multiple images, and provide a service based on information of the classification of the at least some of the multiple images.

In accordance with another aspect of the present disclosure, a method of providing a service associated with images in an electronic apparatus is provided. The method includes acquiring multiple images, acquiring information associated with at least one of the multiple images, classifying at least some of the multiple images into at least one group based on the information associated with the at least one of the multiple images, and providing a service based on information of the classification of the at least some of the multiple images.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
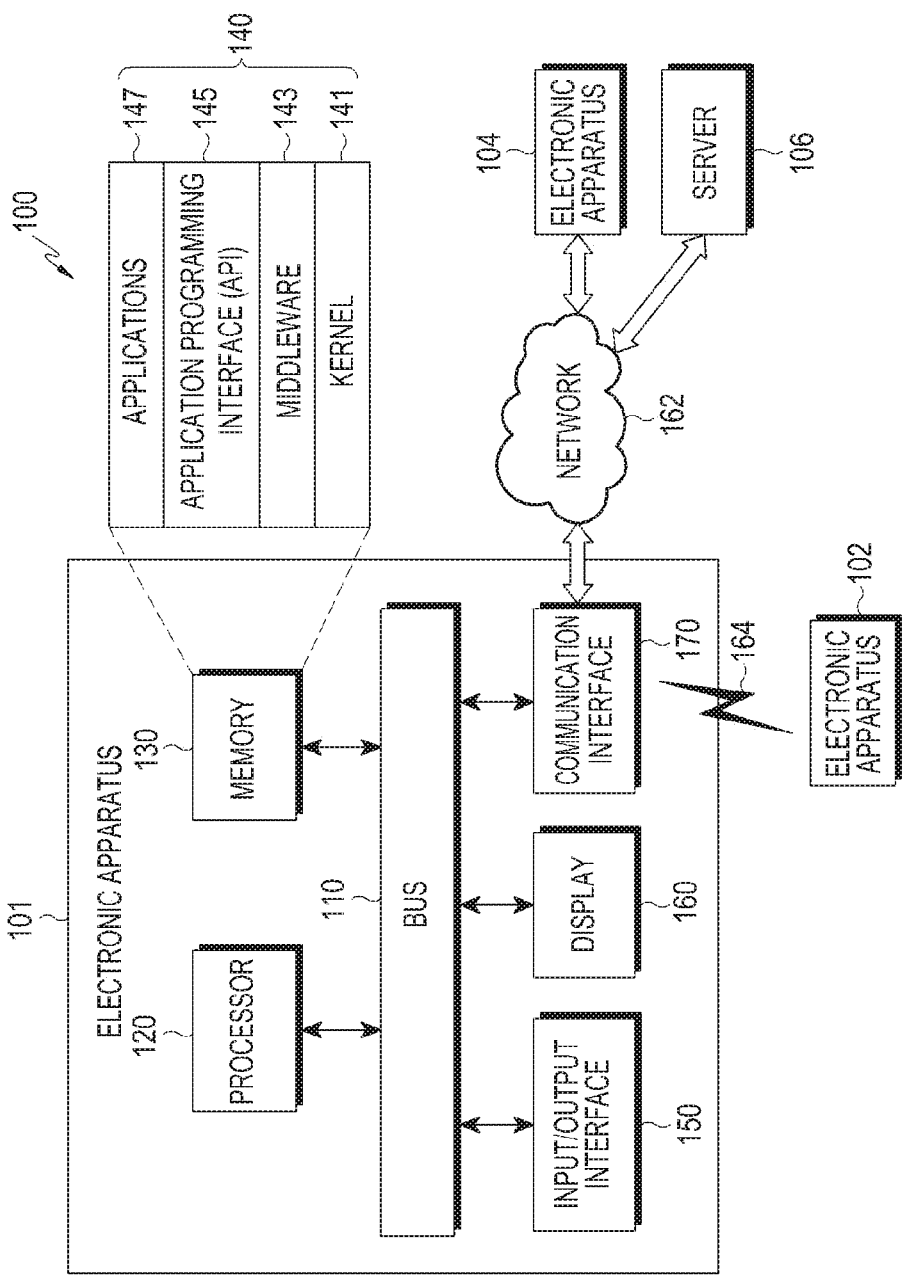
FIG. 1 illustrates an electronic apparatus in a network environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", "A/B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic apparatus according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a moving picture experts group phase 1 or phase 2 (MPEG-1 or MPEG-2) audio layer-3 (MP3) player, a mobile medical device, a camera, and a wearable device. According to various embodiments, the wearable device may include at least one of an accessory type (e.g., a watch, a ring, a bracelet, an anklet, a necklace, glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic apparatus may be a home appliance. The home appliance may include at least one of, for example, a television (TV), a digital video disc (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and Play Station™), an electronic dictionary, an electronic key, a camcorder, and an electronic photo frame.

According to another embodiment, the electronic apparatus may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic apparatus for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic apparatus may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic apparatus may be a combination of one or more of the aforementioned various devices. According to some embodiments, the electronic apparatus may also be a flexible device. Further, the electronic apparatus according to an embodiment of the present disclosure is not limited to the aforementioned devices, and may include a new electronic apparatus according to the development of technology.

Hereinafter, an electronic apparatus according to various embodiments will be described with reference to the accompanying drawings. In the present disclosure, the term "user" may indicate a person using an electronic apparatus or a device (e.g., an artificial intelligence electronic device) using an electronic apparatus.

FIG. 1 illustrates an electronic apparatus in a network environment according to an embodiment of the present disclosure.

Referring to FIG. 1, disclosed is an electronic apparatus 101 in a network environment 100 according to an embodiment of the present disclosure. The electronic apparatus 101 may include a bus 110, a processor 120, a memory 130, an input/output interface 150, a display 160, and a communication module 170 (or referred to as "communication interface"). In some embodiments, at least one of components of the electronic apparatus 101 may be omitted, or the electronic apparatus 101 may be additionally provided with other components.

The bus 110 may, for example, include a circuit that connects the components 120, 130, 150 to 170 to each other and transmit communications (e.g., a control message and/or data) between the components.

The processor 120 may include one or more among a CPU, an AP, and a communication processor (CP). The processor 120 may, for example, execute an operation or data processing relating to control and/or communication of at least one other components. The processor 120 may be referred to as a controller, or include the controller as a portion thereof, or may configure the controller.

The memory 130 may include a volatile memory and/or a nonvolatile memory. The memory 130 may, for example, store an instruction or data associated with at least one other components of the electronic apparatus 101. According to an embodiment, the memory 130 may store a software and/or a program 140. The program 140 may, for example, include a kernel 141, a middleware 143, an application programming interface (API) 145, and/or an application program (or "application") 147, or the like. At least some of the kernel 141, middleware 143, or API 145 may be referred to as an operating system (OS).

The kernel 141 may, for example, control or manage system resources (e.g., the bus 110, processor 120, memory 130, and so on) used to execute the operation or function implemented in other programs (e.g., the middleware 143, API 145, or application program 147). In addition, the kernel 141 may access to individual components of the electronic apparatus 101 in the middleware 143, API 145, or the application program 147 to provide an interface that can control or manage the system resources.

The middleware 143 may perform mediating functions such that the API 145 or the application program 147 can communicate with the kernel 141 to exchange data.

In addition, the middleware 143 may process one or more task requests received from the application program 147 according to the priority order. For example, the middleware 143 may assign the priority order to use the system resources (e.g., bus 110, processor 120, memory 130 or the like) of the electronic apparatus 101 to at least one of the application programs 147. For example, the middleware 143 may process one or more of the task requests according to the priority order assigned to at least one of the application programs 147 to perform scheduling or load balancing with respect to the one or more task requests.

The API 145 is, for example, an interface for controlling functions provided from the kernel 141 or middleware 143 by the application program 147, and may, for example, include at least one interface or function (e.g., instruction) for file controlling, window controlling, image processing, text controlling or the like.

The input/output interface 150 may, for example, play a role of an interface that can transfer instructions or data inputs from the user or an external apparatus to other component(s) of the electronic apparatus 101. In addition, the input/output interface 150 may output the instructions or data received from other component(s) of the electronic apparatus 101 to a user or the external apparatus.

The display 160 may, for example, include a liquid crystal display (LCD), a light-emitting diode (LED) display, an organic LED (OLED) display, a microelectromechanical systems (MEMS) display, or an electronic paper display. The display 160 may, for example, display various kinds of contents (e.g., text, image, video, icon, or symbol) to the user. The display 160 may include a touch screen, and may, for example, receive touch, gesture, proximity, or hovering using an electronic pen or a part of a user's body.

The communication module 170 may, for example, configure a communication between the electronic apparatus 101 and an external apparatus (e.g., a first external electronic apparatus 102, a second external electronic apparatus 104, or a server 106). For example, the communication module 170 may connect to a network 162 through a wireless communication or a wired communication to communicate with the external apparatus (e.g., the second external electronic apparatus 104 or the server 106). The communication module

170 may include a CP, and the CP may constitute one of a plurality (i.e., two or more) of modules constituting the communication module 170. In an embodiment, the CP may be included in the processor 120.

The wireless communication may, for example, be a cellular communication protocol, and may, for example, use at least one of long-term evolution (LTE), LTE advanced (LTE-A), code division multiple access (CDMA), wideband CDMA (WCDMA), universal mobile telecommunications system (UMTS), wireless broadband (WiBro), and global system for mobile communications (GSM). In addition, the wireless communication may, for example, include a local communication 164. The local communication 164 may, for example, include Wi-Fi, Bluetooth (BT), near field communication (NFC), global navigation satellite system (GNSS), or the like. The GNSS may, for example, include at least one of GPS, global navigation satellite system (Glonass), Beidou navigation satellite system (hereinafter, referred to as "Beidou") or Galileo, the European global satellite-based navigation system. Hereinafter, in the present specification, "GPS" and "GNSS" may be interchangeably used. The wired communication may include, for example, at least one of universal serial bus (USB), high definition multimedia interface (HDMI), recommended standard 232 (RS-232), plain old telephone service (POTS) or the like. The network 162 may include at least one of telecommunications networks such as computer network (e.g., local area network (LAN) or wide area network (WAN)), internet, or telephone network.

Each of the first and second external electronic apparatuses 102, 104 may be the same or a different kind of apparatus as the electronic apparatus 101. According to an embodiment, the server 106 may include a group of one or more servers. According to various embodiments, all or some of operations executed on the electronic apparatus 101 may be executed on other one or more electronic apparatuses (e.g., external electronic apparatuses 102, 104 or server 106). According to an embodiment, in the event that the electronic apparatus 101 has to perform some functions or services automatically or on demand, the electronic apparatus 101 may request other apparatuses (e.g., external electronic apparatuses 102, 104, or server 106) to perform at least some of its functions instead of executing the functions or services by itself or additionally. The other electronic apparatuses (e.g., external electronic apparatuses 102, 104, or server 106) may execute the requested functions or additional functions, and transfer the results to the electronic apparatus 101. The electronic apparatus 101 may process the received results itself or additionally to provide the requested functions or services. For this purpose, for example, cloud computing technology, distribution computing technology, or client-server computing technology may be used.

Figure 2:
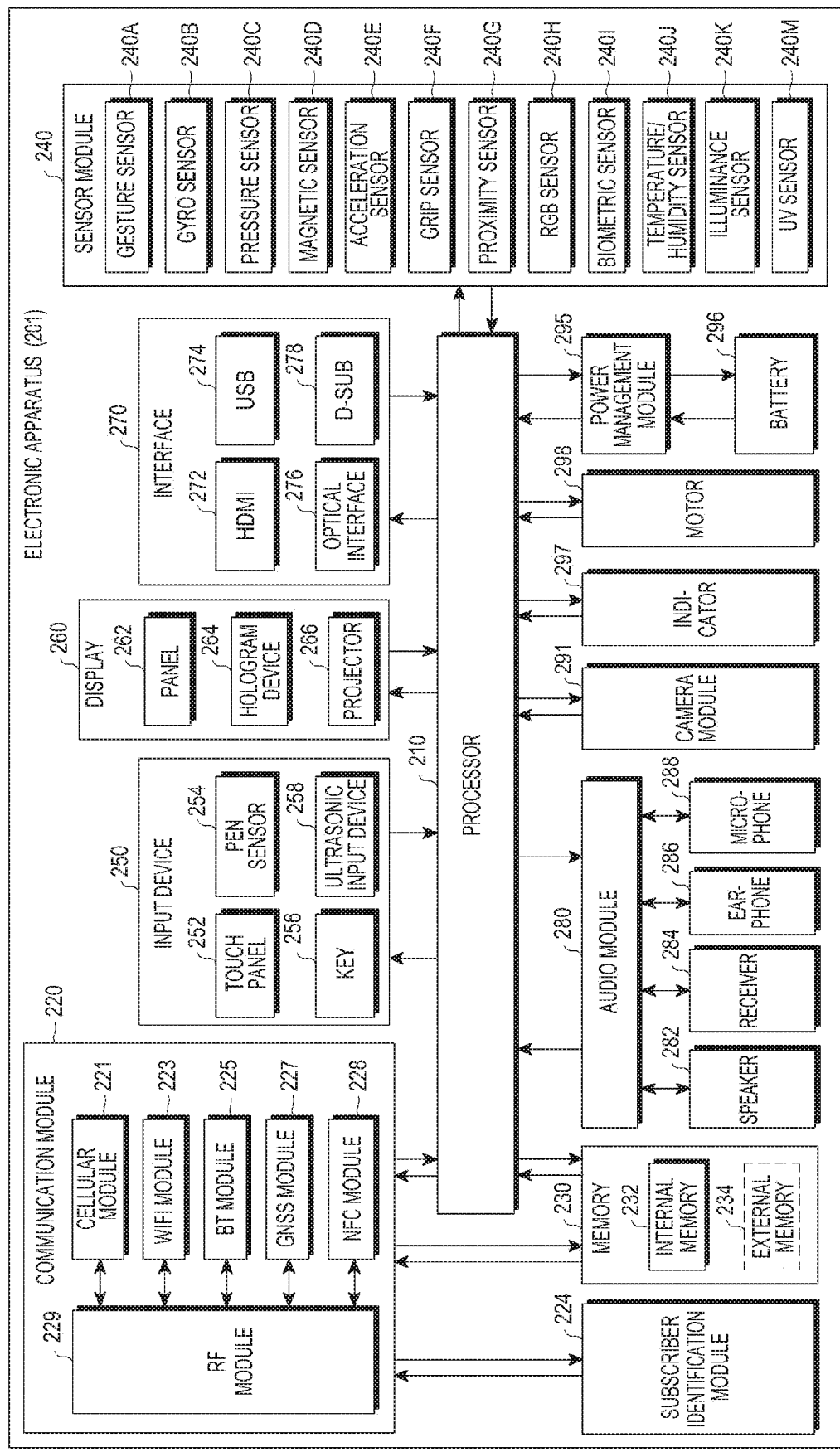
FIG. 2 is a block diagram illustrating an example of an electronic apparatus according to an embodiment of the present disclosure.

FIG. 2 is a block diagram illustrating an example of an electronic apparatus 201 according to an embodiment of the present disclosure. The electronic apparatus 201 may, for example, include the entirety or a portion of the electronic apparatus 101 illustrated in FIG. 1. The electronic apparatus 201 may include one or more processor (e.g., AP) 210, a communication module 220, a memory 230, a sensor module 240, an input device 250 and a display 260, and the electronic apparatus 201 may further include at least one of a subscriber identification module (SIM) 224, an interface 270, an audio module 280, a camera module 291, a power management module 295, a battery 296, an indicator 297, and a motor 298.

The processor 210 may, for example, drive an OS or an application program to control a plurality of hardware components or software components coupled to the processor 210, and may perform various data processing and operations. The processor 210 may be implemented as, for example, a system on chip (SoC). According to an embodiment, the processor may further include a graphics processing unit (GPU) and/or image signal processor (ISP). The processor 210 may include at least some (e.g., cellular module 221) of components illustrated in FIG. 2. The processor 210 may load instructions or data received from at least one of other components (e.g., non-volatile memory) on a volatile memory to process, and may store various data in a non-volatile memory.

The communication module 220 may have the same or similar configuration as the communication module 170 of FIG. 1. The communication module 220 may, for example, include at least one of a cellular module 221, a Wi-Fi module 223, a BT module 225, a GNSS module 227 (e.g., GPS module, Glonass module, Beidou module, or Galileo module), an NFC module 228, and a radio frequency (RF) module 229.

The cellular module 221 may, for example, provide voice call, video call, text messaging, internet service, or the like via a communication network. According to an embodiment, the cellular module 221 may perform identification and authentication for the electronic apparatus 201 within the communication network using a SIM 224 (e.g., SIM card). According to an embodiment, the cellular module 221 may perform at least some functions which the processor 210 can provide. According to an embodiment, the cellular module 221 may include a CP.

Each of the Wi-Fi module 223, BT module 225, GNSS module 227, and NFC module 228 may, for example, include a processor for processing data transmitted and received through corresponding module. According to some embodiments, at least some (e.g., two or more) of the cellular module 221, Wi-Fi module 223, BT module 225, GNSS module 227 or NFC module 228 may be included in one integrated circuit (IC) or IC package.

The RF module 229 may, for example, transmit and receive a communication signal (e.g., RF signal). The RF module 229 may, for example, include a transceiver, a power amp module (PAM), a frequency filter, a low noise amplifier (LNA), an antenna or the like. According to another embodiment, at least one of the Wi-Fi module 223, BT module 225, GNSS module 227, and NFC module 228 may transmit and receive an RF signal through a separate RF module.

The SIM 224 may, for example, include a card and/or an embedded SIM including a SIM, and include unique identification information (e.g., integrated circuit card identifier (ICCID)) or subscriber information (e.g., international mobile subscriber identity (IMSI)).

The memory 230 (e.g., memory 130) may, for example, include an internal memory 232 and/or an external memory 234. The internal memory 232 may, for example, include at least one of a volatile memory (e.g., dynamic random access memory (DRAM), static RAM (SRAM), synchronous dynamic RAM (SDRAM) or the like), a non-volatile memory (e.g., one time programmable read only memory (OTPROM), programmable ROM (PROM), erasable and programmable ROM (EPROM), mask ROM, flash ROM, flash memory (e.g., NAND flash memory, NOR flash memory or the like), a hard drive, or a solid state drive (SSD).

The external memory 234 may further include a flash drive such as a compact flash (CF) drive, a secure digital (SD) drive, a micro-SD drive, a mini-SD drive, an extreme digital (xD) drive, a multi-media card (MMC), a memory stick, or the like. The external memory 234 may be connected functionally and/or physically to the electronic apparatus 201 through various interfaces.

The sensor module 240 may, for example, measure a physical quantity or sense the operating state of the electronic apparatus 201 to convert measured or sensed information into an electrical signal. The sensor module 240 may, for example, include at least one of a gesture sensor 240A, a gyro sensor 240B, a pressure sensor 240C, a magnetic sensor 240D, an acceleration sensor 240E, a grip sensor 240F, a proximity sensor 240G, a red, green, blue (RGB) sensor 240H, a biometric sensor 240I, a temperature/humidity sensor 240J, an illuminance sensor 240K, and an ultra violet (UV) sensor 240M. Additionally or alternatively, the sensor module 240 may, for example, include an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 may further include a control circuit for controlling at least one or more sensors belonging thereto. In some embodiments, the electronic apparatus 201 may further include a processor configured to control the sensor module 240 as a part of the processor 210 or separately to control the sensor module 240 while the processor 210 is in a sleep state.

The input device 250 may, for example, include a touch panel 252, and further include at least one of a (digital) pen sensor 254, a key 256, and an ultrasonic input device 258. The touch panel 252 may, for example, use at least one of an electrostatic type, a pressure sensitive type, an infrared type, and an ultrasonic type. Further, the touch panel 252 may further include a control circuit. The touch panel 252 may further include a tactile layer to provide a tactile response to a user.

The (digital) pen sensor 254 may, for example, be a part of the touch panel or may include a separate recognition sheet. The key 256 may, for example, include a physical button, an optical key, or a keypad. The ultrasonic input device 258 may sense an ultrasonic wave generated by an input tool through a microphone (e.g., microphone 288) and confirm data corresponding to the sensed ultrasonic wave.

The display 260 (e.g., display 160) may include a panel 262, and further include a hologram device 264 and/or a projector 266. The panel 262 may include the same or similar configuration as the display 160 of FIG. 1. The panel 262 may, for example, be implemented flexibly, transparently or wearably. The panel 262 may be composed of the touch panel 252 and one module. The hologram device 264 may display a stereoscopic image in the air using interference of light. The projector 266 may display an image by projecting light onto a screen. The screen may, for example, be located inside or outside the electronic apparatus 201. According to an embodiment, the display 260 may further include a control circuit for controlling the panel 262, hologram device 264, or projector 266.

The interface 270 may, for example, include at least one of a HDMI 272, a USB 274, an optical interface 276, and a D-subminiature (D-sub) 278. The interface 270 may, for example, be included in the communication module 170 illustrated in FIG. 1. Additionally or alternatively, the interface 270 may, for example, include a mobile high-definition link (MHL) interface, an SD card/MMC interface, or an infrared data association (IrDA) standard interface.

The audio module 280 may, for example, convert a sound and an electrical signal in both directions. At least some of the components of the audio module 280 may, for example, be included in the input/output interface 150 illustrated in FIG. 1. The audio module 280 may process sound signals input or output through, for example, a speaker 282, a receiver 284, an earphone 286, or a microphone 288.

The camera module 291 may, for example, be a device capable of photographing still images and moving images. According to an embodiment, the camera module 291 may include at least one of image sensor (e.g., front sensor or rear sensor), a lens, an ISP, or a flash (e.g., LED or xenon lamp, etc.).

The power management module 295 may, for example, manage the power of the electronic apparatus 201. According to an embodiment, the power management module 295 may include a power management integrated circuit (PMIC), a charger IC, or a battery or fuel gauge. The PMIC may have a wired and/or wireless charging method. The wireless charging method may, for example, include a magnetic resonance method, a magnetic induction method, or an electromagnetic wave method, and may further include an additional circuit for wireless charging, for example, a coil loop, a resonant circuit, or a rectifier. The battery gauge may, for example, measure a remaining amount of the battery 296, a voltage during charging, a current, or a temperature. The battery 296 may, for example, include a rechargeable battery and/or a solar battery.

The indicator 297 may display a specific state of the electronic apparatus 201 or some (e.g., processor 210) of the electronic apparatus 201, for example, a booting state, a message state, a charging state or the like. The motor 298 may convert an electrical signal into a mechanical vibration, and may generate a vibration effect, a haptic effect, or the like. Although it is not illustrated, the electronic apparatus 201 may include a processor (e.g., GPU) for supporting a mobile TV. The processor for supporting a mobile TV may, for example, process media data according to a standard such as digital multimedia broadcasting (DMB), digital video broadcasting (DVB), mediaFlo™ or the like.

Each of the components described in this specification may be composed of one or more components, and the name of the component may be changed according to the type of the electronic apparatus. In various embodiments, the electronic apparatus may be configured to include at least one of the components described herein, and may further include additional components or some of the components may be omitted. In addition, some of the components of the electronic apparatus according to various embodiments may be combined into one entity, so that the functions of corresponding components before being combined may be performed in the same manner.

Figure 3:
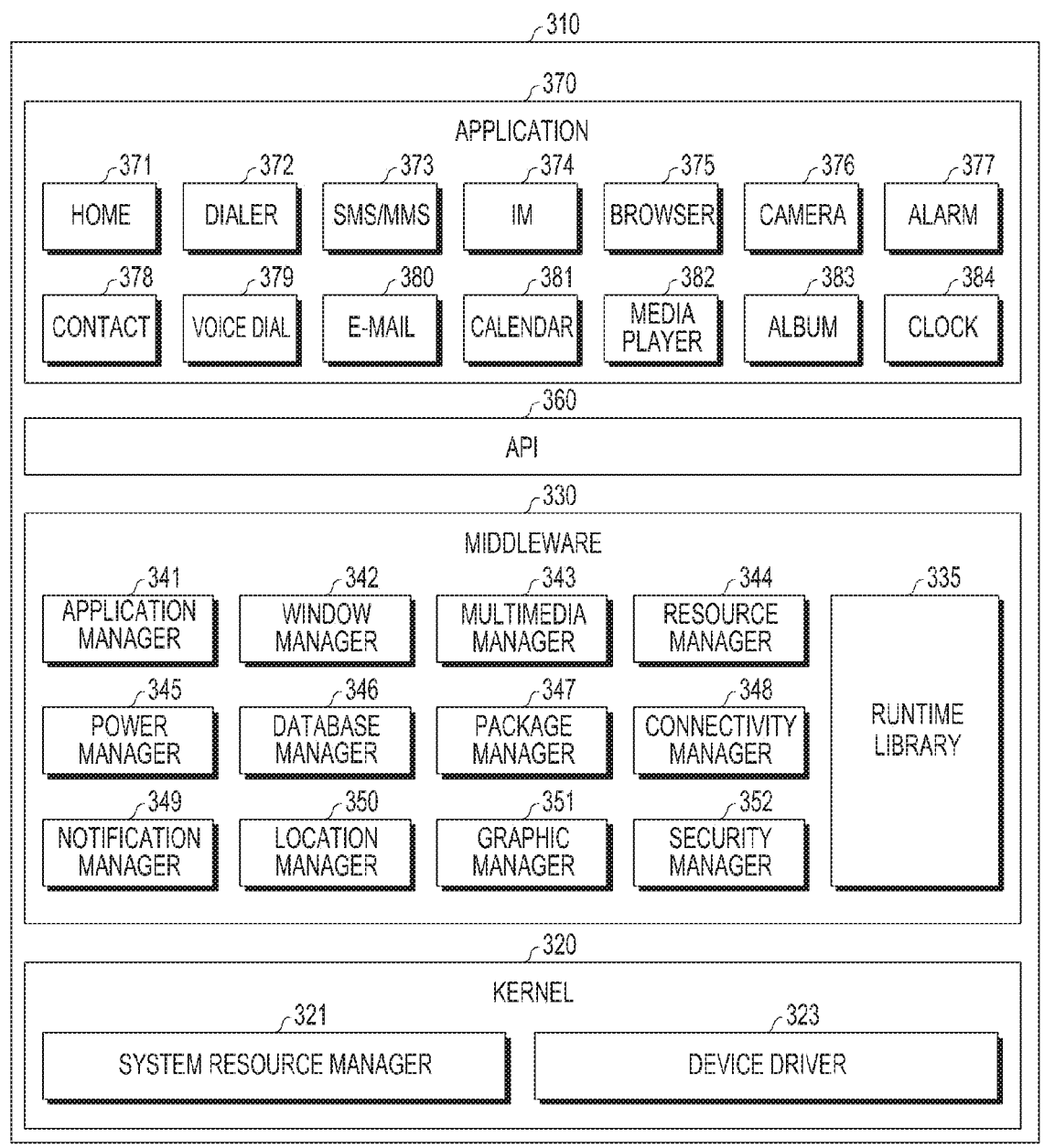
FIG. 3 is block diagram illustrating an example of a program module according to an embodiment of the present disclosure.

FIG. 3 is block diagram illustrating an example of a program module according to an embodiment of the present disclosure.

Referring to FIG. 3, the program module 310 (e.g., program 140) may include an OS for controlling resources associated with the electronic apparatus (e.g., electronic apparatus 101) and/or various applications (e.g., application program 147) operated on the OS. The OS may, for example, be Android, iOS, Windows, Symbian, Tizen, Bada, or the like.

The program module 310 may include a kernel 320, a middleware 330, an API 360, and/or an application 370. At least some of the program module 310 may be preloaded on the electronic apparatus, or may be downloaded from an external apparatus (e.g., at least one of the external electronic apparatuses 102, 104 and the server 106).

The kernel 320 (e.g., kernel 141) may, for example, include a system resource manager 321 and/or a device driver 323. The system resource manager 321 may perform control, allocation, or recovery of system resources. According to an embodiment, the system resource manager 321 may include a process management unit, a memory management unit, a file system management unit, or the like. The device driver 323 may, for example, include a display driver, a camera driver, a BT driver, a shared memory driver, a USB driver, a keypad driver, a Wi-Fi driver, an audio driver, or an inter-process communication (IPC) driver.

The middleware 330 may, for example, provide functions commonly used by the application 370 or may provide various functions to the application through the API 360 to enable the application 370 to efficiently use limited system resources in the electronic apparatus. According to an embodiment, the middleware 330 (e.g., middleware 143) may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, or a security manager 352.

The runtime library 335 may, for example, include a library module used by a compiler to add a new function via a programming language while the application 370 is executed. The runtime library 335 may perform input/output management, memory management, or functions for arithmetic functions.

The application manager 341 may, for example, manage the life cycle of at least one of the applications 370. The window manager 342 may manage graphical user interface (GUI) resources used on the screen. The multimedia manager 343 may recognize a format used for playback of various media files, and may perform encoding or decoding of the media files using a codec suitable for the format. The resource manager 344 may manager a source code, a memory, a storing space or the like of at least one of the applications 370.

The power manager 345 may, for example, operate together with a basic input/output system (BIOS) or the like to manage a battery or a power, and may provide power information or the like used for the operation of the electronic apparatus. The database manager 346 may create, search, or modify a database to be used in at least one of the applications 370. The package manager 347 may manage installation or update of an application distributed in the form of a package file.

The connection manager 348 may manage wireless connections, such as Wi-Fi, BT or the like. The notification manager 349 may display or notify of events, such as an arrival message, appointment, proximity notification, etc. in a manner that does not disturb the user. The location manager 350 may manage the location information of the electronic apparatus. The graphic manager 351 may manage a graphic effect to be provided to the user or a user interface related thereto. The security manager 352 may provide one or more security functions used for system security or user authentication. According to an embodiment, if the electronic apparatus (e.g., electronic apparatus 101) includes a telephone function, the middleware 330 may further include a telephony manager for managing the voice call function or video call function of the electronic apparatus.

The middleware 330 may include a middleware module forming a combination of various functions of the above-described components. The middleware 330 may provide a module specialized for each type of OS in order to provide differentiated functions. Further, the middleware 330 may delete some existing components or add new components, dynamically.

The API 360 (e.g., API 145) may, for example, be a set of API programming functions, and may be provided in a different configuration depending on an OS. For example, in the event of Android or iOS, one API set may be provided for each platform, and in the event of Tizen, two or more API sets may be provided for each platform.

The application 370 (e.g., application program 147) may, for example, include one or more applications capable of performing functions, such as home 371, dialer 372, short message service (SMS)/multimedia message service (MMS) 373, instant message (IM) 374, browser 375, camera 376, alarm 377, contact 378, voice dial 379, e-mail 380, calendar 381, media player 382, album 383, clock 384, health care (e.g., measuring momentum or blood sugar) or environment information providing (e.g., providing pressure, humidity, or temperature information).

According to an embodiment, the application 370 may include an application for supporting information exchange between the electronic apparatus (e.g., electronic apparatus 101) and the external electronic apparatus (e.g., external electronic apparatuses 102, 104), and hereinafter referred to as an "information exchange application" for convenience of explanation. The information exchange application may include, for example, a notification relay application for relaying specific information to the external electronic apparatus or a device management application for managing the external electronic apparatus.

For example, the notification relay application may include a function to relay notification information generated in other applications (e.g., SMS/MMS application, e-mail application, health care application, environment information application) to the external electronic apparatus (e.g., external electronic apparatuses 102, 104). In addition, the notification relay application may, for example, receive notification information from the external electronic apparatus and provide to the user.

The device management application may, for example, manage (e.g., installation, deletion, or update) at least one function (e.g., adjusting turn-on/turn-off of the external electronic apparatus itself (or some components) or brightness (or resolution) of a display) of the external electronic apparatus (e.g., external electronic apparatuses 102, 104) that communicates with the electronic apparatus, applications that operate in the external electronic apparatus, or services (e.g., telephone service, message service, etc.) provided by the external electronic apparatus.

According to an embodiment, the application 370 may include an attribute of the external electronic apparatus (e.g., external electronic apparatuses 102, 104) or an application (e.g., a health care application of a mobile medical device) designated according to the attribute of the external electronic apparatus. According to an embodiment, the application 370 may include an application received from the external electronic apparatus (e.g., server 106 or external electronic apparatuses 102, 104). According to an embodiment, the application 370 may include a preloaded application or a third party application that can be downloaded from the server. The names of the components of the program modules 310 according to the illustrated embodiment may vary depending on the type of the OS.

According to various embodiments, at least some of the program modules 310 may be implemented with software, firmware, hardware, or a combination of at least two of them. At least some of the program modules 310 may, for example, be implemented (e.g., executed) by a processor (e.g., processor 210). At least some of the program modules 310 may include, for example, modules, programs, routines, sets of instructions, processes, or the like for performing one or more functions.

Figure 4:
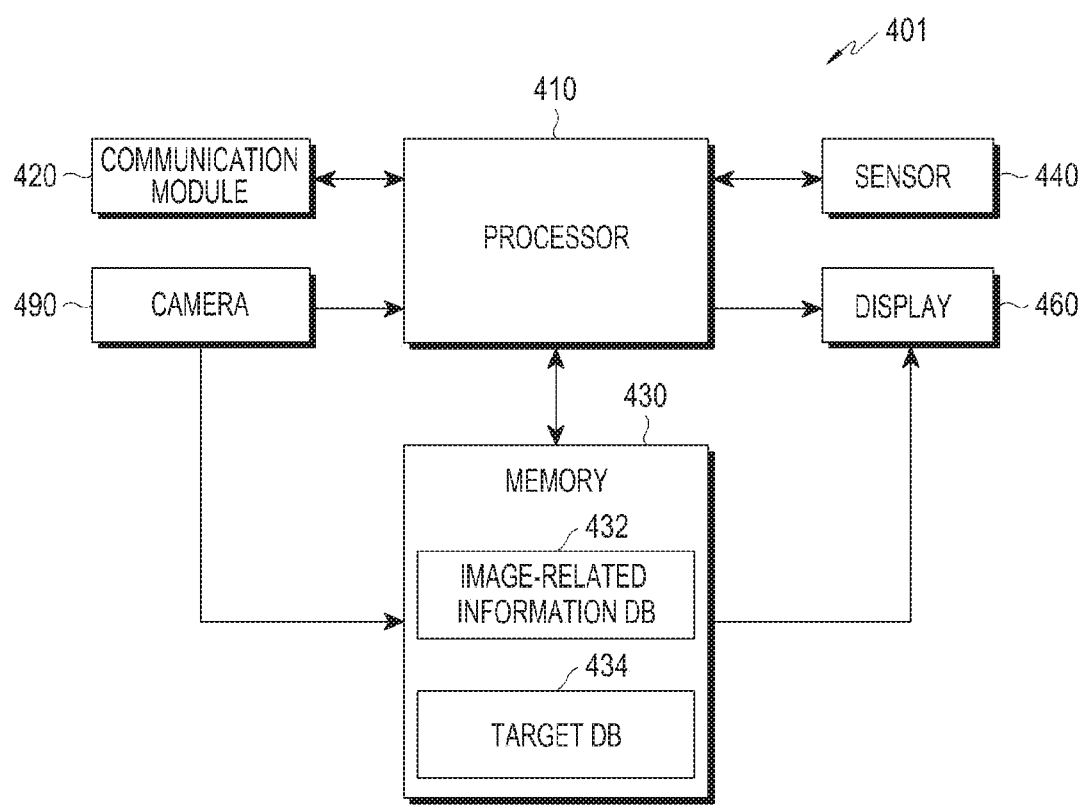
FIG. 4 is a view illustrating a major configuration of an electronic apparatus for performing a method of providing a service associated with images according to an embodiment of the present disclosure.

FIG. 4 is a view illustrating a major configuration of an electronic apparatus for performing a method of providing a service associated with images according to an embodiment of the present disclosure.

Referring to FIG. 4, the electronic apparatus 401 (e.g., electronic apparatuses 101, 201) may include, for example, a camera 490 (e.g., camera module 291), a memory 430 (e.g., memories 130, 230), a display 460 (e.g., displays 160, 260), a sensor (e.g., at least one of the sensor module 240, touch panel 252, GNSS module 227, microphone 288), a communication module 420 (e.g., communication modules 170, 220) and a processor 410 (e.g., processors 120, 210).

The camera 490 may photograph (a) subject(s) in front and/or rear of the electronic apparatus 401, and may output the image(s) of the photographed subject(s). For example, the camera 490 may include a first camera module (or rear side/rear direction camera module) for photographing a rear subject of the electronic apparatus 401 and a second camera module (or front side/front direction camera module) for photographing the subject of the front. For example, each of the camera modules may photograph still images or moving images according to a control of the processor 410, and output the photographed still images or moving images to the processor 410 or the memory 430. The processor 410 may store the photographed still images or moving images in the memory 430, or may display on the display 460. For example, each of the camera modules may generate preview images (or live preview images) for the subject of the front or rear direction, and output the generated preview images to the processor 410 or the display 460. The processor 410 may display the preview images on the display 460. For example, the processor 410 may display the images stored in the memory 430 on the display 460.

The display 460 may display the images, signals, data or information input from the camera 490, memory 430, or the processor 410 on a screen.

The memory 430 may store multiple images, and store at least one of image-related information database 432 and a target database 434. The image-related information database 432 and target database 434 may be portions of one database.

The image-related information database 432 may include at least one of information associated with at least one of the multiple images and information associated with the group(s) of images.

In an embodiment, the information associated with at least one of the multiple images may include recognition information on images, and information associated with images obtained through the camera 490, memory 430, sensor 440, and/or communication module 420.

The information associated with at least one of the multiple images or a group of images may be referred to as meta data/information. For example, the image-related information database 432 may include a plurality of meta data/information corresponding to the multiple images or image group(s), respectively. For example, the plurality of meta data/information may be stored in the form of a database having a plurality of data records.

In an embodiment, the information associated with at least one of the multiple images or a group of images may include situation information indicating the situation/status of the electronic apparatus 401, a user's situation/status or photographing status/situation/condition, information on number/time/frequency of display/play of at least one of the multiple images, information received from an external apparatus, user input information, or search information using an external network.

In an embodiment, the situation information may include information on motion/status of the electronic apparatus 401 or the user, information on the subject, information on the quality of the image, recognition information on the scene or the subject of the image, information on a specific scene category/kind of specific subject/number/time/frequency of photographing for a specific subject, type of event recognized for the scene or subject of the image, disease/symptom/biometric information of the user, information on the current time, information on location/place of the electronic apparatus 401, or ambient sound.

Each of the multiple images may be a still image file, a moving image file, or one image frame of a moving image file.

For example, the still image file may have at least one extension of bmp (*.bmp, *.rle), jpeg (*.jpg), compuserve gif (*.gif), png (*.png), Photoshop (*.psd, *.pdd), tiff (*.tif), Acrobat pdf (*.pdf), raw (*.raw), Illustrator (*.ai), Photoshop eps (*.eps), Amiga iff (*.iff), flashpix (*.fpx), filmstrip (*.frm), pcx (*.pcx), pict file (*.pct, *.pic), Pixar (*.pxr), scitex (*.sct) and targa (*.tga, *.vda, *.icb, *.vst).

For example, the moving image file may include image information and audio information. For example, the moving image file may have at least one extension of mpeg (*.mpeg), mpg (*.mpg), mp4 (*.mpg), avi (8*.avi), mov (*.mov) or mkv (*.mkv). For example, the audio information may be recorded with the images at the time of photographing images through the camera 490.

In an embodiment, the images and the meta data corresponding to the images may be included within one file.

The image-related information database 432 may include a plurality of ontologies, and each ontology may include a plurality of information/data elements and data defining relationship between the plurality of information/data elements.

For example, the ontology is a data model that describes a specific domain, and may be composed of (or include) a set of concepts (or information/data elements) that belong to a specific domain and formal vocabularies that describe a relationship between the concepts. The ontology, which is a collection of vocabularies described in formal languages, may be used for deduction and reasoning. For example, the ontology may include a class representing a name or category designating an object or concept, an instance representing a specific object, event or the like in which the object or concept is expressed in a practical form, a property in which a class or instance is associated with a specific value to represent a specific property or tendency of a class or instance, or a relation representing relationships (e.g., at least one of an inclusive relationship, an equal relationship, and a causal relationship) that exist between classes or instances. At this time, the property may be included in the relation.

The above-described plurality of ontologies may have various data structures, may be expressed, for example, in the form of a data/object tree in which a plurality of information/data elements are connected according to the relations of the plurality of information/data elements, or may be expressed as a number of records that describe the plurality of information/data elements and the relationship between the plurality of information/data elements.

As an example of the plurality of ontologies, the image-related information database 432 may store a plurality of pieces of information corresponding to the plurality of ontologies in a plurality of record types, as shown in Table 1 below.

TABLE 1

| ID | TYPE | CONTENT | RELATION |
|----|------|---------|----------|
| A1 | B1 | C1 | D1 |
| A2 | B2 | C2 | D2 |
| A3 | B3 | C3 | D3 |
| A4 | B4 | C4 | D4 |
| ... | ... | ... | ... |
| An | Bn | Cn | Dn |

The ID $A_i$ ($1 \leq i \leq n$, n is an integer of one or greater) represents unique identification information of information/data elements, the type $B_i$ represents identification information of class/instance and/or category/topic/class, the content $C_i$ represents names of the information/data elements, and relation $D_i$ represents relationships between the information/data elements. Each field (i.e., ID $A_i$, type $B_i$, content $C_i$, relation $D_i$) of the records may have one or more values, and each value may be a constant, a coordinate, a vector, a matrix, a text or the like.

For example, the image-related information database 432 may include an ontology of "[dad]-{couple}-[mom]" or "[chul-soo]-{same person}-[dad]-{couple}-[mom]-{same person}-[young-hee]". Here, "dad", "chul-soo", "mom" and "young-hee" correspond to the information/data elements (or entities), and "same person" and "couple" correspond to the relation. In addition, the category/topic/class of character (or person) to which the "dad" and "mom" belong may correspond to the information/data elements (or entities).

In an embodiment, the image-related information database 432 may include information (or values) or a data model that represents the association between common information/data elements from information (or the plurality of metadata/information) associated with at least one or a group of the multiple images.

The target database 434 may be provided to recognize a preconfigured subject (or, entirety or parts of a person, entirety or parts of an object (including natural objects such as cloud, sky, sea, etc.)). The target data for recognizing the subject may include a subject image, a feature point (or may be referred to as a feature image, a feature pattern, etc.) information of the subject image or the like. Such feature points may be edges, corners, image patterns, contours, or the like.

In an embodiment, the target data for recognizing the subject may include a recognition reference, and the recognition reference may be defined by morphological characteristics such as shape/motion/size/color/brightness of object/person or may be defined by categories such as food/person/flower/sky/pet/building.

The sensor 440 may be used to detect situation information representing situation/status of the electronic apparatus 401, situation/status of the user, or photographing status/situation/condition or user input information. For example, the sensor 440 may detect at least one of information on motion/status of the electronic apparatus 401 or the user, information on subject, information on quality of images, recognition information on scenes or subjects of the images, types of events recognized about scenes or subjects of the images, a user's disease/symptom/biometric information, information on current/photographing time, information on location/place of the electronic apparatus 401, or ambient sounds.

The communication module 420 may receive the multiple images from the external apparatus (e.g., the first external electronic apparatus 102, second external electronic apparatus 104, or server 106).

In an embodiment, the communication module 420 may be used for searching for information associated with at least one or a group of the multiple images (or multiple pieces of metadata/information) using an external database/system/network (e.g., transmitting information for searching, receiving search results).

In an embodiment, the communication module 420 may be used for receiving recognition information on images from the external apparatus (e.g., the first external electronic apparatus 102, second external electronic apparatus 104, or server 106).

In an embodiment, the communication module 420 may receive selection information on at least one of the multiple images or a group of images, application information, or messages from the external apparatus (e.g., the first external electronic apparatus 102, second external electronic apparatus 104, or server 106).

In an embodiment, the communication module 420 may transmit graphic elements including at least one text element associated with at least one or a group of the multiple images to the external apparatus (e.g., first external electronic apparatus 102, second external electronic apparatus 104, or server 106).

The processor 410 may include at least one of a CPU, an AP, a CP, an ISP, and a GPU.

The processor 410 may receive images taken by the camera 490 from the camera 490, or may read images stored in the memory 430.

In an embodiment, the processor 410 may recognize information included in the images based on the target database 434.

In an embodiment, the processor 410 may transmit the images and/or information associated with the images to the first external apparatus (e.g., first external electronic apparatus 102, second external electronic apparatus 104, or server 106), and may receive recognition information on the images from the first external apparatus or the second external apparatus.

In an embodiment, the processor 410 may detect situation information representing situation/status of the electronic apparatus 401, situation/status of the user, or photographing status/situation/condition through the sensor 440.

In an embodiment, the processor 410 may detect user input information (e.g., at least one of title, tag, memo, selection information of images) associated with the images through the sensor 440 or the display 460.

In an embodiment, the processor 410 may detect configuration information of the camera 490 at a time of/while photographing of the images through the camera 490 or the memory 430. For example, the configuration information may include at least one of information on start/end/whole time of photographing, photographing mode information (e.g., at least one of night mode, portrait mode, indoor mode, face recognition mode, panorama mode), information on period/area/point of interest, and information on photographing speed (or frame rate).

The processor 410 may acquire multiple images and information associated with at least one of the multiple images. The processor 410 may classify at least some of the multiple images into at least one group based on at least in part on the information associated with at least one of the multiple images. The processor 410 may provide services/functions, based on at least in part on information on classification of the images.

In an embodiment, the target database 434 may store data or information on the composition/placement of the subjects. Each piece of the composition information may include information on a plurality of subjects, and information on each subject may include information on the type (or name) of the subject, information on the location, size, or direction of the subject, a scene category or the like.

The type information of the subject may be a person, plant, animal, food, building, road, feature, natural object (e.g., at least one of sea, river, lake and sky) or the like.

The location information of the subject may be a location of a representative point (e.g., central point) of the subject, or locations of corner points defining the subject. Such locations may be represented by coordinates, a ratio (e.g., ⅓ position of the total horizontal size from the left end of the image, ⅓ position of the total vertical size from the top of the image, etc.) and so on.

The size information of the subject may include constant values, coordinates (coordinates of corner points), ratios (e.g., ⅓ position of the total horizontal size from the left end of the image, ⅓ position of the total vertical size from the top of the image, etc.) and so on.

The direction information of the subject represents the pose, orientation, or direction of the subject, and for example, may represent information on which direction the subject is facing (e.g., front, left, right, top, bottom, etc.). The direction information of the subject may be represented in a two-dimensional or three-dimensional rectangular coordinate system, five orientations of front, left, right, upper and lower, 9-orientations of front, left, right, upper, lower, upper left, lower left, upper right, and lower right, and so on.

The scene category may represent the category/type of the entire scene (e.g., at least one of an urban intersection, in front of a crossing, a beach, a riverside, a building front/side, road/road for walk) represented by the entire input image.

The target database 434 may have various data structures and, for example, as shown in Table 2 below, the target database 434 may store a plurality of pieces of information in a plurality of record formats. The target database 434 may be expressed by a plurality of records describing a plurality of information/data elements and a relationship between the plurality of information/data elements.

TABLE 2

| RECORD No. | TYPE OF SUBJECT | LOCATION/ SIZE OF SUBJECT | DIRECTION OF SUBJECT | SCENE CATEGORY |
|---|---|---|---|---|
| E1 | F1 | G1 | H1 | I1 |
| E2 | F2 | G2 | H2 | I1 |
| E3 | F3 | G3 | H3 | I2 |
| E4 | F4 | G4 | H4 | I1/I2 |
| ... | ... | ... | ... | ... |
| En | Fn | Gn | Hn | Im |

Each record Ei (1≤i≤n, n is an integer of one or greater) may include fields such as type of the subject Fi, location/size of the subject Gi, direction of the subject Hi, and category of the entire scene Ii. With respect to each scene category Ii, a plurality of pieces of subject information may correspond to, and each piece of subject information may include a subject type Fi, a plurality of subject positions/sizes Gi, a plurality of subject directions Hi or the like. The letter m is an integer that is equal to or greater than one, and equal to or less than n. In addition, each piece of subject information may correspond to the plurality of scene categories. The subject location/size Gi may be expressed by the coordinates of the diagonal corner points defining the subject, or expressed by the subject center location and the size of the subject. Each field may have one or a plurality of values, and each value may be a constant, a coordinate, a vector, a matrix, a text, or the like.

The processor 410 may recognize the subject from the images photographed by the camera 490 or the images stored in the memory 430. The processor 410 may recognize what the subject is in the input image through a recognition algorithm according to the type of the subject. Further, the processor 410 may recognize at which position and in which direction the subject is looking (i.e., the position and pose of the subject).

The processor 410 may recognize the subject registered in the target database 434 from the input images through an algorithm such as scale invariant feature transform (SIFT), speeded up robust features (SURF) or the like, and may estimate the pose of the subject by applying a template-based matching method to the recognized subject. The SIFT has been disclosed in the following paper:

Lowe, David G., "Object recognition from local scale-invariant features", Proceedings of the International Conference on Computer, Vision 2, pp. 1150-1157. doi:10.1109/ICCV.1999.790410., 1999.

The SURF has been disclosed in the following paper:

Bay, H.; Tuytelaars, T.; Gool, L. V., "SURF: Speeded Up Robust Features", Proceedings of the ninth European Conference on Computer Vision, May 2006.

The method of estimating the pose using the template-based matching method has been disclosed in the following paper:

Daniel Wagner, Gerhard Reitmayr, Alessandro Mulloni, Tom Drummond, and Dieter Schmalstieg, "Real Time Detection and Tracking for Augmented Reality on Mobile Phones," in Visualization and Computer Graphics, August 2009.

The processor 410 may recognize the subject registered in the target database 434 from the input images and may estimate the pose of the subject on the basis of two dimensional (2D) or three dimensional (3D) subject information stored in the target database 434.

The processor 410 may recognize an image area matching with the subject registered in the target database 434 from the input image. In addition, the processor 410 may recognize the subject without referring to the target database 434 depending on the type of the recognition target. For example, the processor 410 may detect the edge feature points and the corner feature points in the input image, and recognize a planar subject such as a rectangle, circle, polygon, or the like defined by edge feature points and corner feature points.

The processor 410 may search for the scene category information matching with the composition/placement of the subject recognized in the target database 434. The processor 410 may detect a corresponding scene category on the basis of the types, locations, and/or directions of the subjects.

The processor 410 may recognize situation information such as a photographing target, a photographing location/place or the like, based on at least one of information of the recognized subjects (e.g., types, locations and/or directions of the recognized subjects), scene category information of the recognized subjects, and location information (e.g., location information via the GNSS module 227 or the GPS module) of the electronic apparatus 401.

In an embodiment, the processor 410 may recognize the situation information such as photographing target, photographing location/place or the like on the basis of the identification information and/or strength of the wireless signal (e.g., at least one of a Wi-Fi signal, a BT signal, an NFC signal) received through the communication module 420.

In an embodiment, the processor 410 may acquire information on an indoor photographing location using the NFC module (e.g., NFC module 228) of the communication module 420. For example, when an NFC device (e.g., NFC reader or sensor) is mounted at a predetermined interval in an indoor space or at a predetermined position of the indoor space (e.g., at least one of a door position, a corner position of each room, a lamp position, a center of wall, a floor or a ceiling), the processor 410 may receive the NFC signal through the NFC module or receive the location-related information from the NFC reader that has received the NFC signal of the NFC module to identify the location of the electronic apparatus 401. For example, the accuracy can be further improved according to shorter intervals of the NFC devices, and the processor 410 may predict the coordinates of the electronic apparatus 401 by detecting a move distance and direction after detecting the NFC signal.

In an embodiment, the processor 410 may determine the location information of the photographed object or electronic apparatus 401 using a marker technique. The marker technique is a technique for identifying the location of a corresponding marker by decoding a specific marker included in the image, and determining a relative location between the marker and the electronic apparatus 401. The marker may be one of a barcode, a 2D code (quick response (QR) code, PDF-417, data matrix, ColorCode™), or a water mark. The processor 410 may determine coordinates, direction information, or the like by decoding the marker. Since the shape of the marker is deformed according to the photographing direction of the camera 490, the position information of the electronic apparatus 401 can be predicted through the pose or direction information of the electronic apparatus 401 photographing the marker, size information of the marker, location of the marker on the image or the like.

In an embodiment, the target database 434 may include a radio signal fingerprint database, and the radio signal fingerprint database may include information on the distribution of radio signals in an indoor space (e.g., identification information and strength of the radio signals by each location). For example, the processor 410 may receive at least one radio signal including identification information from the external apparatus through the communication module 420, compare and/or match the identification information and the strength of the radio signal with signal information (i.e., identification information and strength) in the radio signal fingerprint database, and determine location information of the electronic apparatus 401 from the location information in the radio signal fingerprint database corresponding to the matched signal information.

In an embodiment, the electronic apparatus 401 may be at least one of a necklace/clip type camera, an action camera, glasses, a camcorder, a life log camera, a closed circuit television (CCTV), a drone, and a black box of a car/air plane.

According to various embodiments, an electronic apparatus providing a service associated with images may include a memory and a processor that performs: acquiring multiple images; acquiring information associated with at least one of the multiple images; classifying at least some of the multiple images into at least one group, based on at least in part on information associated with at least one of the multiple images; and providing a service/function, based on at least in part on information on classification of the images.

According to various embodiments, the acquiring multiple images may include acquiring situation information representing situation/status of the electronic apparatus, situation/status of the user, or photographing status/situation/condition; and starting/stopping/postponing photographing/acquiring of the images, or adjusting the photographing/acquiring interval of the images, based on at least in part on a comparison result of the situation information and a preconfigured condition.

According to various embodiments, the acquiring multiple images may include acquiring situation information representing situation/status of the electronic apparatus, situation/status of the user, or photographing status/situation/condition; and starting/stopping/postponing photographing/acquiring of the images, or adjusting the photographing/acquiring interval of the images, based on at least in part on a comparison result of the situation information and a preconfigured condition, and the situation information may include at least one of information on motion/status of the electronic apparatus or the user, information on the subject, information on the quality of the images, recognition information on the scenes or the subject of the images, the type of event recognized for the scenes or the subject of the image, a user's disease/symptom/biometric information, information on the current/photographing time, information on the location/place of the electronic apparatus, or ambient sound.

According to various embodiments, the acquiring multiple images may include detecting a value representing the motion of the electronic apparatus and the user; comparing the value representing the motion of the electronic apparatus and the user with a preconfigured condition (e.g., above/below threshold value); and starting/stopping/postponing photographing/acquiring of the images, or adjusting the photographing/acquiring interval of the images, based on at least in part on a comparison result.

According to various embodiments, the acquiring multiple images may include photographing the images according to a preconfigured cycle/time interval.

According to various embodiments, the acquiring multiple images may include calculating a value representing the quality of the images; comparing the value representing the quality of the images with a preconfigured condition (e.g., over/under a threshold value); and starting/stopping/postponing photographing/acquiring of the images, or adjusting the photographing/acquiring interval for the images, based on at least in part on a comparison result.

According to various embodiments, the acquiring multiple images may include recognizing the scenes or the subjects of the images; comparing the information on the scenes or the subjects with a preconfigured condition (e.g., whether the matching accuracy with the information preconfigured in the electronic apparatus exceeds a threshold value); and starting/stopping/postponing photographing/acquiring of the images, or adjusting the photographing/acquiring interval of the images, based on at least in part on a comparison result (e.g., matching, matching accuracy is over the threshold value).

According to various embodiments, the acquiring multiple images may include performing at least one of detecting a value representing the motion of the electronic apparatus and the user, calculating the value representing the quality of the images and recognizing the scenes of the images or the subject; comparing at least one of the value representing the motion of the electronic apparatus and the user, the value representing the quality of the images, and the recognition information on the scene or the subject with at least one of preconfigured conditions; and starting/stopping/postponing photographing/acquiring of the image, or adjusting the photographing/acquiring interval for the images, based on at least in part on a comparison result.

According to various embodiments, the acquiring multiple images may include comparing a value representing the motion of the electronic apparatus or the user with a preconfigured first condition (e.g., over/under a threshold value); when the value representing the motion satisfies the preconfigured first condition (e.g., under the threshold value), comparing the recognition information on the scenes or the subjects of the images with a preconfigured second condition (e.g., whether the matching accuracy with the information preconfigured in the electronic apparatus exceeds a threshold value); and when the recognition information on the scenes or the subjects satisfies the preconfigured second condition (e.g., matching, matching accuracy over the threshold value), photographing/acquiring the images or reducing the photographing/acquiring interval for the images.

According to various embodiments, the acquiring multiple images may include comparing a value representing the quality of the images with a preconfigured first condition (e.g., over/under a threshold value); when the value representing the quality of the images satisfies the preconfigured first condition (e.g., over the threshold value), comparing the recognition information on the scenes of the images or the subject with a preconfigured second condition (e.g., whether the matching accuracy with the information preconfigured in the electronic apparatus exceeds a threshold value); and when the recognition information on the scenes or the subjects satisfies the preconfigured second condition (e.g., matching, matching accuracy over the threshold value), photographing/acquiring the images or reducing the photographing/acquiring interval for the images.

According to various embodiments, the acquiring multiple images may include comparing a value representing the motion of the electronic apparatus or the user with a preconfigured first condition (e.g., over/under a threshold value); when the value representing the motion satisfies the preconfigured first condition (e.g., under the threshold value), comparing a value representing the quality of the images with a preconfigured second condition (e.g., over/under a threshold value); when the value representing the quality of the images satisfies the preconfigured second condition (e.g., over the threshold value), comparing recognition information on the scenes or the subjects of the images with a preconfigured third condition (e.g., whether the matching accuracy with the information preconfigured in the electronic apparatus exceeds a threshold value); and when the recognition information on the scenes or the subjects satisfies the preconfigured third condition (e.g., matching, matching accuracy over the threshold value), photographing/acquiring the images or reducing the photographing/acquiring interval for the images.

According to various embodiments, the acquiring multiple images may include: detecting a value representing the motion of the electronic apparatus or the user; performing at least one of calculating a value representing the quality of the images, and recognizing the scenes or the subjects of the images; comparing at least one of the value representing the motion, the value representing the quality of the images, and the recognition information on the scenes or the subjects with at least one of conditions preconfigured in the electronic apparatus; and when at least one of the value representing the motion, the value representing the quality of the images, and the recognition information on the scenes or the subjects does not satisfy at least one of the conditions preconfigured in the electronic apparatus, stopping/postponing photographing/acquiring of the images or increasing the photographing/acquiring interval for the images.

According to various embodiments, the acquiring multiple images may include: detecting a value representing the status of the electronic apparatus or the user; performing at least one of calculating a value representing the quality of the images, and recognizing the scenes or the subjects of the images; comparing at least one of the value representing the status, the value representing the quality of the images, and the recognition information on the scenes or the subjects with at least one of conditions preconfigured in the electronic apparatus; and activating/deactivating at least one of the components of the electronic apparatus, based on at least in part on a comparison results.

According to various embodiments, the acquiring multiple images may include at least one of receiving multiple images from an external device, acquiring the multiple images through photographing by a camera of the electronic apparatus, or reading the multiple images stored in a memory of the electronic apparatus.

According to various embodiments, the acquiring multiple images may include detecting a subject entering an angle of view of the camera functionally connected to the electronic apparatus or a preconfigured area within the angle of view; and starting/stopping/postponing photographing/acquiring of the images or adjusting a photographing/acquiring interval for the images in response to detection of the subject.

According to various embodiments, the acquiring multiple images may include: detecting a subject having a larger size than a preconfigured size through a camera functionally connected to the electronic apparatus; and starting/stopping/postponing photographing/acquiring of the images or adjusting a photographing/acquiring interval for the images in response to detection of the subject.

According to various embodiments, the at least one group may correspond to a type of at least one event of the user preconfigured in the electronic apparatus.

According to various embodiments, the information associated with at least one of the multiple images may include situation information representing the situation/status of the electronic apparatus, the situation/status of the user or photographing status/situation/condition, information on number/time/frequency of display/play for at least one of the multiple images, information received from an external apparatus, user input information or search information using an external network.

According to various embodiments, the acquiring information associated with at least one of the multiple images may include: transmitting the multiple images to an external apparatus; and receiving selection information for at least one of the multiple images.

According to various embodiments, the providing a service/function may include: selecting at least one representative image for each of the at least one group; and displaying/playing the at least one representative image.

According to various embodiments, the providing a service/function may include: selecting at least one representative image for each group, based on at least in part on at least one of total photographing time of the images of each group, the number/amount/size of the entire images of each group, types of the events corresponding to each group, or user input; and displaying/playing the at least one representative image.

According to various embodiments, the providing a service/function may include: selecting at least one representative image for each group, based on at least in part on (e.g., proportionally) at least one of total photographing time of the images of each group, the number/amount/size of the entire images of each group, types of events corresponding to each group; and displaying/playing the at least one representative image, wherein at least one of the number/amount/size of the entire representative images of each group, display/play time or display/play speed may be determined based on at least in part on at least one of the total photographing time of each group, the number/amount/size of the entire images, or types of events corresponding to each group.

According to various embodiments, the providing a service/function may include: selecting at least one representative image for at least one group; and displaying/playing the at least one representative image, wherein the at least one representative image may be an image that is selected in a preconfigured time interval from the entire images of each group, or an image that is different from the adjacent image among the entire image of each group.

According to various embodiments, the providing a service/function may include sequentially playing the images of the at least one group, in response to the user input, and at least one of playing time or playing speed of the images of each group may be determined, based on at least in part on at least one of the total photographing time of images of each group, the number/amount/size of one or more (or all) images of each group, the type of event corresponding to each group, or a user input.

According to various embodiments, the providing a service/function may include allocating values representing a priority to each of the plurality of groups based on at least in part on the type of event corresponding to each group.

According to various embodiments, the providing a service/function may include configuring the title of each group or the type of event based on at least in part on the information associated with at least one image of each group.

According to various embodiments, the providing a service/function may include: combining text elements of information associated with at least one image of each group based on a plurality of information/data elements and a database defining a relationship between the plurality of information/data elements; and displaying the combination of the text elements or storing the combination of the text elements as information on each group or image of each group.

According to various embodiments, the acquiring information associated with at least one of the multiple images may include: transmitting the multiple images to an external device; and receiving selection information on at least one of the plurality images and application information, and the providing a service/function may include: executing/activating the application corresponding to the application information; and displaying/playing images corresponding to the selection information through the application.

According to various embodiments, the providing a service/function may include: executing/activating the application; and displaying/playing images of at least one group through the application.

According to various embodiments, the providing a service/function may include: transmitting at least one of the multiple images or information on at least one of the multiple images to an external device; receiving a message from the external device; and displaying the message.

According to various embodiments, the providing a service/function may include: selecting at least one text element of information associated with at least one image of each group on the basis of a plurality of information/data elements and a database defining the relationship between the plurality of information/data elements; and displaying graphing elements including the selected at least one text element or transmitting to the external device.

According to various embodiments, the providing a service/function may include: selecting at least one text element of information associated with at least one image of each group on the basis of a plurality of information/data elements and a database defining the relationship between the plurality of information/data elements; and executing an application associated with at least one selected text element.

According to various embodiments, the providing a service/function may include: displaying the at least one image of at least one group and graphic elements generated based on at least in part on the information associated with at least one image; and receiving a response with respect to the graphic elements.

According to various embodiments, the providing a service/function may include: displaying the at least one image of at least one group and graphic elements generated based on at least in part on the information associated with at least one image; receiving a response with respect to the graphic elements; and displaying comparison result of the information associated with at least one image and the response.

According to various embodiments, the providing a service/function may include: displaying representative images of a plurality of groups; detecting selection for one representative image among the plurality of groups; and displaying images of the group to which the representative image belongs in response to detecting the selection.

According to various embodiments, the providing a service/function may include displaying at least one image of at least one group and a graphic element generated based on at least in part on the location/place/time of photographing of the image.

According to various embodiments, the providing a service/function may include: executing a schedule application; and sorting and displaying the images of the at least one group in time order on the screen of the schedule application.

Figure 5:
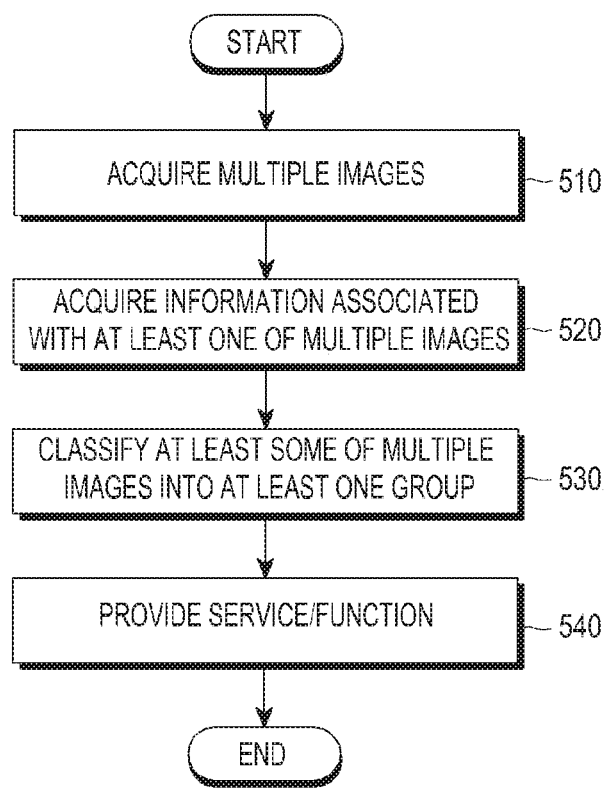
FIG. 5 is a flow chart illustrating a method of providing a service associated with images of an electronic apparatus according to an embodiment of the present disclosure.

FIG. 5 is a flow chart illustrating a method of providing a service associated with images of an electronic apparatus according to an embodiment of the present disclosure. The method of providing a service associated with images of the electronic apparatus (e.g., electronic apparatus 101, 201, and 401) may include operations 510 to 540. The method of providing a service associated with images of the electronic apparatus may be performed by at least one of the electronic apparatus, or a control unit or processor (e.g., processors 120, 210, and 410) of the electronic apparatus.

Referring to FIG. 5, in operation 510, the electronic apparatus may perform acquiring multiple images.

In an embodiment, the electronic apparatus may acquire multiple images for a subject using a camera (e.g., camera module 291, camera 490) that is functionally connected to the electronic apparatus.

In an embodiment, the electronic apparatus may display the multiple images on a display (e.g., displays 160, 260, and 460) that is functionally connected to the electronic apparatus or a first area (or, a first screen area or a first window) on the display in real time, at a time of/while photographing the multiple images.

In an embodiment, the photographing for the multiple images may be automatically started according to reception of a photographing instruction from the user or configuration information stored in a memory (e.g., memories 130, 230, and 430) that is functionally connected to the electronic apparatus.

In an embodiment, the ending of photographing for the multiple images may be automatically performed according to reception of an ending of photographing instruction from the user or configuration information stored in the memory. For example, the electronic apparatus may receive the photographing instruction and/or ending of photographing instruction through an input device (e.g., at least one of the input device 250, displays 160, 260, 460, microphone 288, sensor module 240, sensor 440).

In an embodiment, the photographing for the multiple images may be automatically and periodically started according to the period/time interval information stored in the memory (e.g., memories 130, 230, and 430).

In an embodiment, the electronic apparatus may read the multiple images from the memory.

In an embodiment, the electronic apparatus may receive the multiple images from an external apparatus (e.g., external electronic apparatuses 102, 104, server 106, etc.) through a communication module (e.g., communication modules 170, 220, and 420) that is functionally connected to the electronic apparatus.

In an embodiment, the acquiring multiple images may include: acquiring situation information representing situation/status of the electronic apparatus, situation/status of the user, or photographing status/situation/condition; and starting/stopping/postponing photographing/acquiring for the image, or adjusting the photographing/acquiring interval for the images, based on at least in part on a comparison result of the situation information and a preconfigured condition.

In an embodiment, the situation information may include at least one of information on the motion/status of the electronic apparatus or the user, information on the subject, information on the quality of images, recognition information on the scenes or the subjects of the images, type of event recognized for the scenes or the subjects of the images, a user's disease/symptom/biometric information, information of the current/photographing time, information on location/place of the electronic apparatus, or ambient sound.

In an embodiment, the acquiring multiple images may include: detecting a value representing the motion of the electronic apparatus or the user; comparing the value representing the motion of the electronic apparatus or the user with a preconfigured condition (e.g., above/below threshold value); and starting/stopping/postponing photographing/acquiring of the images, or adjusting the photographing/acquiring interval for the images, based on at least in part on a comparison result.

In an embodiment, the acquiring multiple images may include: calculating a value representing the quality of the images; comparing the value representing the quality of the images with a preconfigured condition (e.g., over/under a threshold value); and starting/stopping/postponing photographing/acquiring of the images, or adjusting the photographing/acquiring interval for the images, based on at least in part on a comparison result.

In an embodiment, the acquiring multiple images may include: recognizing the scenes or the subject of the images; comparing the information on the scenes or the subjects with a preconfigured condition (e.g., whether the matching accuracy with the information preconfigured in the electronic apparatus exceeds a threshold value); and starting/stopping/postponing photographing/acquiring of the images, or adjusting the photographing/acquiring interval for the images, based on at least in part on a comparison result (e.g., matching, matching accuracy over the threshold value).

In an embodiment, the acquiring multiple images may include detecting a value representing the motion of the electronic apparatus and the user, performing at least one of calculating the value representing the quality of the images and recognizing the scenes or the subjects of the images, comparing at least one of the value representing the motion of the electronic apparatus and the user, the value representing the quality of the images, and the recognition information on the scene or the subject with at least one of preconfigured conditions, and starting/stopping/postponing photographing/acquiring of the images, or adjusting the photographing/acquiring interval for the images, based on at least in part on a comparison result.

In an embodiment, the acquiring multiple images may include comparing the value representing the motion of the electronic apparatus or the user with a preconfigured first condition (e.g., over/under a threshold value), when the value representing the motion satisfies the preconfigured first condition (e.g., under the threshold value), comparing the recognition information on the scenes or the subjects of the images with a preconfigured second condition (e.g., whether the matching accuracy with the information preconfigured in the electronic apparatus exceeds a threshold value), and when the recognition information on the scenes or the subjects satisfies the preconfigured second condition (e.g., matching, matching accuracy over the threshold value), photographing/acquiring the images or reducing the photographing/acquiring interval for the images.

In an embodiment, the acquiring multiple images may include comparing the value representing the quality of the images with a preconfigured first condition (e.g., over/under a threshold value), when the value representing the quality of the images satisfies the preconfigured first condition (e.g., over the threshold value), comparing the recognition information on the scenes or the subjects of the images with a preconfigured second condition (e.g., whether the matching accuracy with the information preconfigured in the electronic apparatus exceeds a threshold value), and when the recognition information on the scenes or the subjects satisfies the preconfigured second condition (e.g., matching, matching accuracy over the threshold value), photographing/acquiring the images or reducing the photographing/acquiring interval for the images.

In an embodiment, the acquiring multiple images may include comparing the value representing the motion of the electronic apparatus or the user with a preconfigured first condition (e.g., over/under a threshold value), when the value representing the motion satisfies the preconfigured first condition (e.g., under the threshold value), comparing a value representing the quality of the images with a preconfigured second condition (e.g., over/under a threshold value), when the value representing the quality of the images satisfies the preconfigured second condition (e.g., over the threshold value), comparing recognition information on the scenes or the subjects of the images with a preconfigured third condition (e.g., whether the matching accuracy with the information preconfigured in the electronic apparatus exceeds a threshold value), and when the recognition information on the scenes or the subjects satisfies the preconfigured third condition (e.g., matching, matching accuracy over the threshold value), photographing/acquiring the images or reducing the photographing/acquiring interval for the images.

In an embodiment, the acquiring multiple images may include detecting a value representing the motion of the electronic apparatus or the user, performing at least one of calculating a value representing the quality of the images and recognizing the scenes or the subjects of the images, comparing at least one of the value representing the motion, the value representing the quality of the images, and the recognition information on the scenes or the subjects with at least one of conditions preconfigured in the electronic apparatus, and when at least one of the value representing the motion, the value representing the quality of the images, and the recognition information on the scenes or the subjects does not satisfy at least one of the conditions preconfigured in the electronic apparatus, stopping/postponing photographing/acquiring of the images or increasing the photographing/acquiring interval for the images.

In an embodiment, the acquiring multiple images may include detecting a value representing the status of the electronic apparatus or the user, performing at least one of calculating a value representing the quality of the images and recognizing the scenes or the subjects of the images, comparing at least one of the value representing the status, the value representing the quality of the images, and the recognition information on the scenes or the subjects with at least one of conditions preconfigured in the electronic apparatus, and activating/deactivating at least one of the components of the electronic apparatus, based on at least in part of on a comparison results.

In an embodiment, the acquiring multiple images may include at least one of receiving multiple images from an external device, acquiring the multiple images through photographing by a camera of the electronic apparatus, and reading the multiple images stored in a memory of the electronic apparatus.

In an embodiment, the acquiring multiple images may include detecting a subject entering an angle of view of the camera functionally connected to the electronic apparatus or a preconfigured area within the angle of view, and starting/stopping/postponing photographing/acquiring of the images or adjusting a photographing/acquiring interval for the images in response to detection of the subject.

In an embodiment, the acquiring multiple images may include detecting a subject having a larger size than a preconfigured size through a camera functionally connected to the electronic apparatus, and starting/stopping/postponing photographing/acquiring of the images or adjusting a photographing/acquiring interval for the images in response to detection of the subject.

In operation 520, the electronic apparatus may perform acquiring information associated with at least one of the multiple images.

In an embodiment, the information associated with at least one of the multiple images may include situation information representing situation/status of the electronic apparatus, situation/status of the user or photographing situation/status/condition, information on number/time/frequency of display/play for at least one of the multiple images, information received from an external device, user input information, or information discovered using an external network.

In an embodiment, the situation information may include at least one of information on the motion/status of the electronic apparatus or the user, information on a subject, information on the quality of images, recognition information on the scenes or the subjects of the images, information on a specific scene category/type of a specific subject/photographing number/time/frequency for the specific subject, type of event recognized for the scenes or the subjects of the images, a user's disease/symptom/biometric information, information on the current/photographing time, information on location/place of the electronic apparatus, or ambient sound.

In an embodiment, the recognition information may include at least one of identification information for a user included in the image, identification information for an object included in the image, composition information of the subjects included in the image, information on a text included in the image, and color/saturation/luminosity/brightness information of the image.

In an embodiment, the electronic apparatus may recognize information included in the image on the basis of a first database (e.g., image-related information database 432) and/or a second database (e.g., target database 434) that are stored in the memory.

In an embodiment, the electronic apparatus may transmit an image and/or information associated with the image to a first external apparatus (e.g., a first external electronic apparatus 102, second external electronic apparatus 104, or server 106), and may receive recognition information for the image from the first external electronic apparatus or the second external electronic apparatus.

In an embodiment, the electronic apparatus may detect situation information (e.g., at least one of photographing time, photographing location/place, ambient sound at a time of/during photographing) representing photographing situation/condition of the image through a sensor (e.g., at least one of sensor 440, sensor module 240, touch panel 252, GNSS module 227, microphone 288).

In an embodiment, the electronic apparatus may detect user input information (e.g., at least one selection information on a title of an image, tag, memo) associated with an image through the sensor or the display.

In an embodiment, the electronic apparatus may detect configuration information of the camera 490 at a time of/while photographing for the image through the camera or the memory.

In an embodiment, the configuration information may include at least one of information on start/end/whole time of photographing, photographing mode information (e.g., at least one of night mode, portrait mode, indoor mode, face recognition mode, panorama mode), information on period/area/point of interest, and information on photographing speed (or frame rate).

In an embodiment, the acquiring information associated with at least one of the multiple images may include transmitting the multiple images to an external device, and receiving selection information for at least one of the multiple images.

In operation 530, the electronic apparatus may perform classifying at least some of the plurality of the images into at least one group, based on at least in part on the information associated with at least one of the plurality of the images.

In an embodiment, the electronic apparatus may classify at least some of the plurality of the images into at least one group according to types of events recognized for the scene or the subject of each image. For example, the types of events may include at least one of schedule/event on a schedule application, breakfast, exercise, sport activities, outdoor/indoor wedding photographing, walking, lunch, watching TV, dinner, washing, sleeping, leisure activities, meeting/conversing with a friend, meeting/conversing with a new person, visiting a known place/new place, or the like.

In an embodiment, the electronic apparatus may classify at least some of the plurality of the images into at least one group, based on type/identification information of the subject recognized for the scene or the subject of each image.

For example, the electronic apparatus may classify images associated with food among the multiple images into one group.

For example, the electronic apparatus may classify images including a first user (or a portion of the body) into a first group, and classify images including a second user (or a portion of the body) into a second group, among the multiple images.

For example, the electronic apparatus may classify at least some of the multiple images into one group according to display/play number/time/frequency for at least one of the multiple images. For example, the electronic apparatus may classify images including the same/same type of subject as the subjects included in an image with display/play number/time/frequency that is relatively high or over a threshold value among the multiple images into one group.

In an embodiment, the electronic apparatus may classify at least some of the multiple images into one group according to information on a specific scene category/type of a specific subject/photographing number/time/frequency for a specific subject. For example, the electronic apparatus may classify images including the subject and/or scene having photographing number/time/frequency that is relatively high or over a threshold value among the multiple images into one group.

In operation 540, the electronic apparatus may perform providing a service/function, based on at least in part on information on classification of the images.

In an embodiment, the providing a service/function may include: selecting at least one representative image for each of the at least one group; and displaying/playing the at least one representative image.

In an embodiment, the providing a service/function may include selecting at least one representative image for each group, based on at least in part on at least one of total photographing time of the images of each group, the number/amount/size of the entire images of each group, types of the events corresponding to each group, or user input, and displaying/playing the at least one representative image.

In an embodiment, the providing a service/function may include selecting at least one representative image for each group, based on at least in part on at least one of total photographing time of the images of each group, the number/amount/size of the entire images of each group, types of the events corresponding to each group, and displaying/playing the at least one representative image, and at least one of the number/amount/size of the entire representative images of each group, display/play time or display/play speed may be determined based on at least in part on (e.g., proportionally) at least one of the total photographing time of each group, the number/amount/size of the entire images, or types of the events corresponding to each group.

In an embodiment, the providing a service/function may include selecting at least one representative image for at least one group, and displaying/playing the at least one representative image, and the at least one representative image may be an image that is selected in a preconfigured time interval from the entire images of each group, or an image having a large difference from the adjacent image among the entire images of each group.

In an embodiment, the providing a service/function may include sequentially playing the images of the at least one group, in response to the user input, and display/play number/amount/size/time/play speed of the images of each group may be determined based on at least in part on at least one of the total photographing time of images of each group, the number/amount/size of one or more (or all) images of each group, the type of event corresponding to each group, or a user input.

In an embodiment, the providing a service/function may include allocating values representing a priority (or priority order) to each of the plurality of groups based on at least in part on the type of event corresponding to each group. For example, in the case of a normal elderly person, a relatively higher priority may be allocated to an unusual event (and a group corresponding to the event) such as meeting/conversing with a new person, visiting a known/new place and so on than a usual event (e.g., meal/sleep). For example, in the case of an elderly person with diabetes, a relatively high priority may be allocated to the meal event. For example, in the case of an elderly person who has dementia or who often cannot not recognize a person, a relatively high priority may be allocated to an event related to face detection, such as meeting/conversing with a friend or a new person.

For example, the electronic apparatus may configure so that at least one of the number/amount/size or display/play time of the entire representative image of a first group having a relatively high priority becomes greater (or becomes longer) than that of a second group having a relatively low priority, based on the priority allocated to each group. For example, the electronic apparatus may configure so that display/play speed of the entire representative images of the first group having a relatively high priority becomes less (or becomes slower) than that of the second group having a relatively low priority, based on the priority allocated to each group.

For example, the electronic apparatus may configure so that the number/amount/size of display/play time of the images of the first group having a relatively high priority becomes greater (or becomes longer) than that of the second group having a relatively low priority, based on the priority allocated to each group. For example, the electronic apparatus may configure so that the display/play speed of the images of the first group having a relatively high priority becomes less (or becomes slower) than that of the second group having a relatively low priority, based on the priority allocated to each group.

In an embodiment, the providing a service/function may include configuring the type of event or title of group, based on at least in part on information associated with at least one image of each group.

In an embodiment, the providing a service/function may include combining text elements of information associated with at least one image of each group based on a plurality of information/data elements and a database defining a relationship between the plurality of information/data elements, and storing the combination of the text elements as information on each group or on an image of each group.

In an embodiment, the acquiring information associated with at least one of the multiple images may include transmitting the multiple images to an external device, and receiving selection information and application information on at least one of the multiple images, and the providing service/function may include executing/activating an application corresponding to the application information, and displaying/playing the images corresponding to the selection information through the application.

In an embodiment, the providing a service/function may include executing/activating the application, and displaying/playing images of at least one group through the application.

In an embodiment, the providing a service/function may include transmitting at least one of the multiple images or information on at least one of the multiple images to an external device, receiving a message from the external device, and displaying the message.

In an embodiment, the providing a service/function may include selecting at least one text element of information associated with at least one image of each group on the basis of a plurality of information/data elements and a database defining the relationship between the plurality of information/data elements, and displaying graphing elements (e.g., text, image) including the selected at least one text element or transmitting to the external device.

In an embodiment, the providing a service/function may include selecting at least one text element of information associated with at least one image of each group on the basis of a plurality of information/data elements and a database defining the relationship between the plurality of information/data elements, and executing an application associated with at least one selected text element.

In an embodiment, the providing a service/function may include displaying the at least one image of at least one group and graphic elements generated at least partially based on the information associated with at least one image, receiving a response with respect to the graphic elements, and displaying comparison result of the information associated with at least one image and the response.

In an embodiment, the providing a service/function may include displaying representative images of a plurality of groups, detecting selection for one representative image among the plurality of groups, and displaying images of the group to which the representative image belongs in response to detection of the selection.

In an embodiment, the providing a service/function may include displaying at least one image of at least one group and a graphic element generated based on at least in part on the location/place/time of photographing for the image.

In an embodiment, the providing a service/function may include executing a schedule application, and sorting and displaying the images of the at least one group in chronological order on the screen of the schedule application.

In an embodiment, the providing a service/function may include displaying the images by automatically adjusting the image selection reference, the number of images, the interval, etc. according to the user's symptom level.

Figure 6:
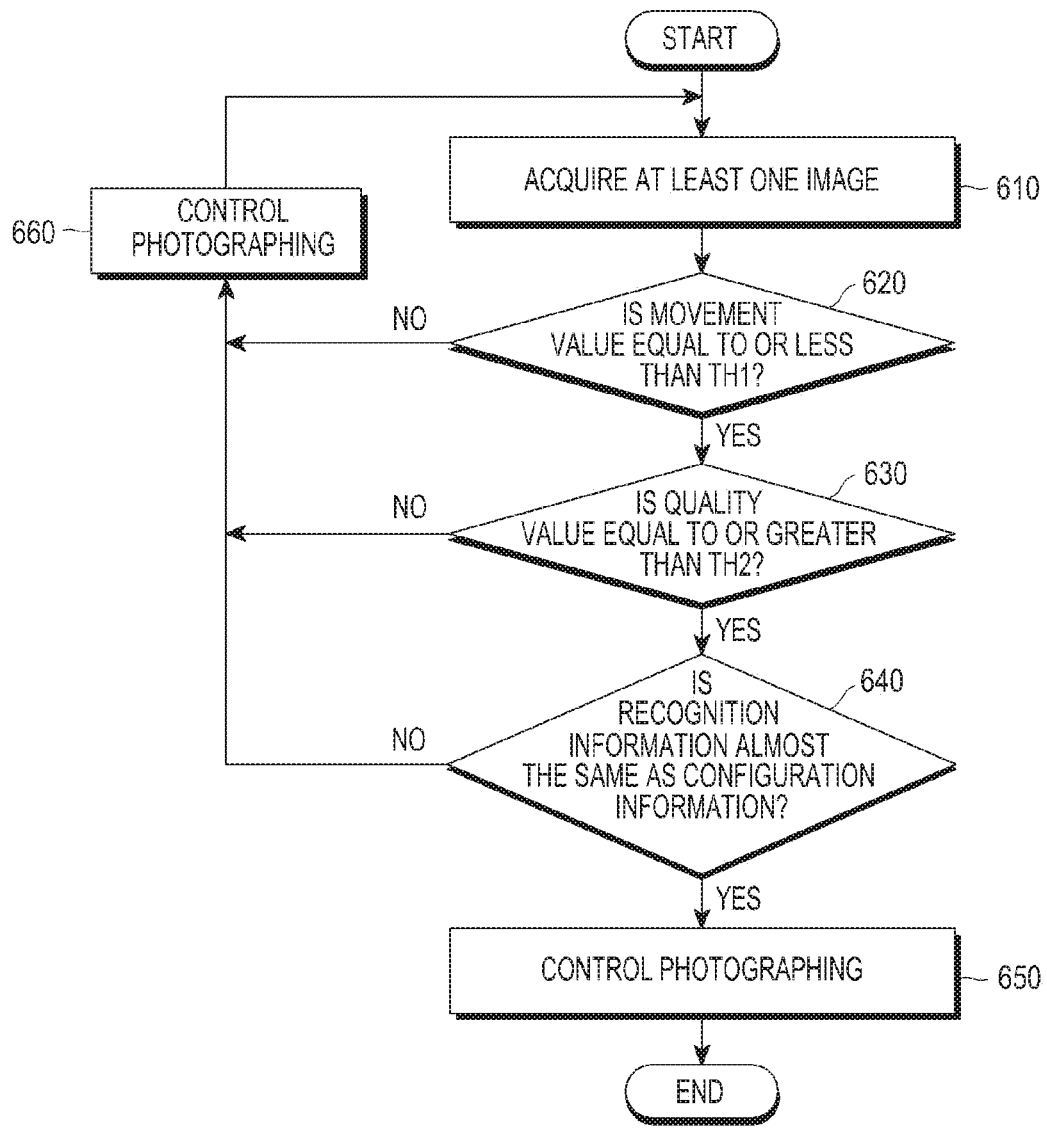
FIG. 6 is a flow chart illustrating a method of acquiring images of an electronic apparatus according to an embodiment of the present disclosure.
Figure 7A:
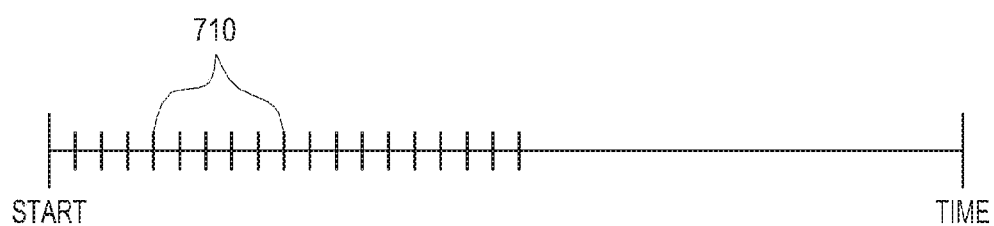
FIGS. 7A and 7B are views illustrating a method of acquiring images of an electronic apparatus according to an embodiment of the present disclosure.
Figure 7B:
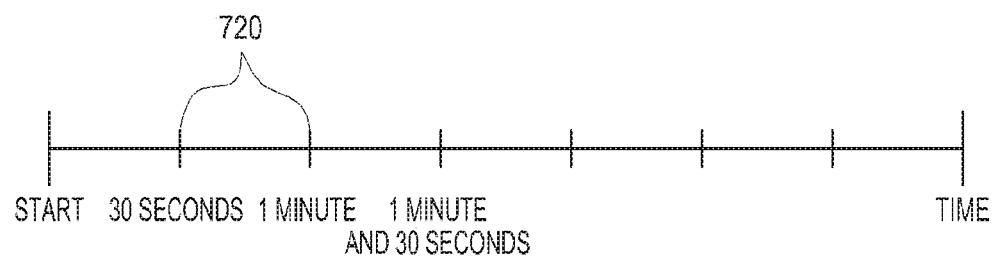

FIG. 6 is a flow chart illustrating a method of acquiring an image of an electronic apparatus according to an embodiment of the present disclosure, FIGS. 7A and 7B are views illustrating a method of acquiring an image of an electronic apparatus according to an embodiment of the present disclosure. The method of acquiring an image of the electronic apparatus (e.g., electronic apparatuses 101, 201, and 401) may include operations 610 to 660. The method of acquiring an image of the electronic apparatus may be performed by at least one of the electronic apparatus, or a control unit or processor (e.g., processors 120, 210, and 410) of the electronic apparatus.

Referring to FIG. 6, in operation 610, the electronic apparatus may perform acquiring/photographing at least one image.

For example, the at least one image may be a preview image (live preview image) of the subject acquired using a camera (e.g., camera module 291, camera 490) that is functionally connected to the electronic apparatus, or a periodically/continuously photographed/recorded image according to the period/time interval information stored in a memory (e.g., memories 130, 230, 430) that is functionally connected to the electronic apparatus. The preview image may have a relatively lower resolution (or fewer number of pixels) and/or a smaller size than the photographed/recorded image. The photographed/recorded image may be permanently stored in the memory until the image is deleted by the user or damaged due to a mechanical error of the memory. The preview image may not be permanently stored in the memory, and may be temporarily stored for displaying on a display (e.g., displays 160, 260, and 460) that is functionally connected to the electronic apparatus, and then automatically deleted.

In an embodiment, the photographed/recorded image may be transmitted and stored periodically/aperiodically (e.g., when a new image is photographed/recorded by the electronic apparatus) to an external server such as a cloud server, a webhard server or the like, by the electronic apparatus. Alternatively, the electronic apparatus may receive periodically/aperiodically (e.g., when a new image is photographed/recorded by the electronic apparatus) the photographed/recorded image from the external server such as a cloud server, webhard server or the like.

In an embodiment, the photographing/recording at least one of multiple images may be automatically started according to reception of a photographing instruction from the user or configuration information stored in the memory. For example, the electronic apparatus may receive the photographing instruction through an input device (e.g., at least one of an input device 250, displays 160, 260, 460, microphone 288, sensor module 240, sensor 440).

In an embodiment, the electronic apparatus may display the at least one image on a display (e.g., displays 160, 260, and 460) that is functionally connected to the electronic apparatus or on a first area (or, a first scene area or a first window) on the display in real time, at a time of/during photographing of the at least one image.

In operation 620, the electronic apparatus may compare a value (i.e., motion value) representing the motion of the electronic apparatus or the user with a preconfigured first condition (e.g., over/under a first threshold value (TH1)). The electronic apparatus, if the motion value satisfies the first condition (e.g., in the case that the motion value is equal to or less than the first threshold TH1), may perform operation 630, and if the motion value does not satisfy the first condition (e.g., in the case that the motion value exceeds the first threshold TH1), may perform operation 660 or may repeat operation 610 at a regular interval.

In an embodiment, the electronic apparatus may acquire a value representing the motion (e.g., rotation, shift, acceleration or vibration) of the electronic apparatus or the user using sensors (e.g., at least one of the sensor 440, sensor module 240, acceleration sensor 240E, gyro sensor 240B, GNSS module 227, GPS module, biometric sensor 240I) of the electronic apparatus.

In an embodiment, the electronic apparatus may acquire a value representing the motion of the subject in at least one image as a value representing the motion of the electronic apparatus or the user.

In an embodiment, the electronic apparatus may select an immovable object (e.g., building, road, bridge, etc.) from subjects in the at least one image. The electronic apparatus may acquire a value representing the motion of the immovable object in at least one image as a value representing the motion of the electronic apparatus or the user.

In an embodiment, the electronic apparatus may estimate a global motion of other images based on a selected reference image from the at least one image. For example, such a global motion may mean the motion of the entire subjects, which is mainly caused by camera movement such as camera shift, rotation, etc. Local motion may mean the motion of some of the subjects, or the motion of some of a subject. Further, estimation of motion may mean finding a motion vector or matrix.

In an embodiment, the electronic apparatus may compare a biometric information value (e.g., heart rate) of a user detected using a biometric sensor (e.g., biometric sensor 240I) with a preconfigured first condition (e.g., over/under a first threshold TH1).

For example, the electronic apparatus may detect the biometric information value such as pulse, heart rate, oxygen saturation, blood flow, etc. using a biometric sensor. For example, the electronic apparatus may detect at least one of health information, disease information, exercise information, activity information, and sleep information, using the biometric sensor.

The biometric sensor may collect raw data for measuring one or more among a user's blood pressure, blood flow, heart rate, body temperature, respiratory rate, oxygen saturation, cardiac tone detection, blood glucose, waist circumstance, height, weight, body fat, calorie consumption, brain wave, voice, skin resistance, electromyography, electrocardiogram, footstep, ultrasound image, sleep state, facial expression (face), pupil dilation or eye blinking.

In an embodiment, the electronic apparatus may analyze the biometric signal to generate biometric information (or referred to as "biometric characteristic information"). For example, a pulse wave signal acquired through a heart rate variability (HRV) sensor may be the biometric signal. The electronic apparatus may analyze the biometric signal to obtain primary biometric information such as an average heart rate or heart rate distribution, and may process the biometric information to obtain secondary biometric information such as higher level stress or vascular aging degree. In an embodiment, the biometric sensor may simply output the collected user biometric signals, or may analyze the biometric signal through the embedded processor to output the biometric information. Accordingly, the biometric signals collected through the biometric sensor are transferred to a processor in the biometric sensor, a processor of the electronic apparatus in which the biometric sensor is embedded, or a processor of an external device (e.g., server 106 or second external electronic apparatus 104) to be used to produce biometric information.

In an embodiment, the electronic apparatus may acquire all, or an average of, operation values or one of a value representing the motion of the subject in at least one image and a value representing motion detected using the sensor as (a) value(s) representing the motion of the electronic apparatus or the user.

In an embodiment, the electronic apparatus may compare values representing the motion of the electronic apparatus or the user with a first threshold TH1 for a preconfigured time (e.g., 1~3 seconds). If the values representing the motion of the electronic apparatus or the user are equal to or less than the first threshold TH1 for the preconfigured time, the electronic apparatus may determine that the first condition is satisfied. The values representing the motion of the electronic apparatus or the user may be input to the electronic apparatus at a regular interval.

In an embodiment, the electronic apparatus may determine whether a second values representing the motion of the electronic apparatus or the user after the first values is maintained below the first threshold TH1 for the preconfigured time, from the time when a first value representing the motion of the electronic apparatus or the user becomes equal to or less than the first threshold TH1. If at least one of the values representing the motion of the electronic apparatus exceeds the first threshold TH1 for the preconfigured time, the electronic apparatus may determine that the first condition is not satisfied. If the first condition is determined to be not satisfied, electronic apparatus may determine whether the values representing the motion of the electronic apparatus or the user subsequently input are maintained below the first threshold TH1 for the preconfigured time.

In an embodiment, the electronic apparatus may determine that the first condition is satisfied, if all, or an average of, operation values or one of a value representing the motion of the subject in the at least one image and a value representing the motion detected using the sensor are (is) maintained below a preconfigured threshold value(s) (or threshold values of a first type) for the preconfigured time.

In operation 630, the electronic apparatus may perform comparing a value representing the quality (i.e., quality value) of at least one image with a preconfigured second condition (e.g., over/under a second threshold value TH2). The electronic apparatus may perform operation 640 when the quality value satisfies the second threshold value TH2 (e.g., when the quality value is equal to or greater than the second threshold value TH2), and may perform operation 660 or repeat operation 610 at a regular interval when the quality value does not satisfy the second condition (e.g., when the quality value is under the second threshold value TH2).

In an embodiment, the quality value may include at least one of values representing blur of an image (i.e., a blur value), values representing sharpness (i.e., a sharpness value), a value representing degree of focusing, a value representing motion, a value representing blocking, and a value representing smear.

In an embodiment, the electronic apparatus may select one of the multiple images as a reference image and compare remaining images with the selected reference image to calculate sharpness values or blur values relative to the remaining images of the multiple images. For example, the electronic apparatus may select a first image among the multiple images as the reference image. For example, the electronic apparatus may generate a differential image of an image different from the reference image and may determine the thickness of the edge portion of the subject in the differential image as the blur value. The differential image may be an image having a value obtained by subtracting the pixel value of the same position of the other image from the pixel value of the reference image as the pixel value of the position.

In an embodiment, the electronic apparatus may calculate a sharpness value or a blur value for each of the at least one image. For example, the electronic apparatus may determine the thickness of the edge portion of the subject in each image as the blur value.

In an embodiment, the electronic apparatus may calculate a sharpness value or a blur value for a resized image after resizing the at least one image into a larger size.

In an embodiment, the electronic apparatus may compare the quality values with the second threshold value TH2 for a preconfigured time period (e.g., 1~3 sec.). The electronic apparatus may determine that the second condition is satisfied when the quality values are equal to or greater than the second threshold value TH2 for the preconfigured time period. The quality values may be calculated by the electronic apparatus at a regular interval.

In operation 640, the electronic apparatus may compare the recognition information for the scenes or subjects of at least one image with a preconfigured third condition (e.g., whether the matching accuracy with the information previously configured/registered in the electronic apparatus is not less than a third threshold value (e.g., 80~100%)). The electronic apparatus may perform operation 650 when the recognition information satisfies the third condition (e.g., in case where the matching accuracy between recognition information and configured information is not less than the third threshold value), and may perform operation 660 or repeat operation 610 at a regular interval when the recognition information does not satisfy the third condition (e.g., in case where the matching accuracy between recognition information and configured information is less than the third threshold value).

In an embodiment, the electronic apparatus may recognize information (e.g., scene category, subject) included in an image. For example, the electronic apparatus may recognize information included in the image based on a target database (e.g., target database 434).

In an embodiment, the electronic apparatus may transmit images and/or information associated with images to a first external apparatus (e.g., the first external electronic apparatus 102, second external electronic apparatus 104, or server 106), and may receive the recognition information for the images from the first external apparatus or a second external apparatus.

In an embodiment, the configuration/registration information stored in the memory (e.g., memory 130, 230, and 430) may include at least one of a subject type, a scene/place category/type, registered user's image/feature information, and registered image/feature information of an object.

In an embodiment, the electronic apparatus may compare at least one of a subject type, a scene/place category/type, registered user's image/feature information, and registered image/feature information of an object with at least one corresponding to a registered subject type, registered scene/place category/type, registered user's image/feature information, and image/feature information of a registered object. For example, the electronic apparatus may determine that the third condition is satisfied, if the matching accuracy between the recognition information and the configuration information is not less than the preconfigured third threshold value.

In an embodiment, the electronic apparatus may recognize a meaningful background/building or a meaningful behavior/gesture of a person in the image. For example, the electronic apparatus, when recognizing a meaningful background/building in the image, may use at least one of location information (e.g., location information through GNSS module 227 or GPS module) or search for information using an external network.

In operation 650, the electronic apparatus may perform a first photograph control operation of starting photographing/acquiring of the images or reducing a photographing/acquiring interval for the images.

Referring to FIG. 7A, the electronic apparatus, when at least one of the first to third conditions is satisfied, may reduce the interval of photographing/acquiring time points 710 for the images (e.g., configuring/changing in a cycle of 1 second).

In operation 660, the electronic apparatus may perform a second photograph control operation of stopping/postponing photographing/acquiring of the images or increasing the photographing/acquiring interval for the images.

Referring to FIG. 7B, the electronic apparatus, when at least one of the first to third conditions is not satisfied, may increase the interval of photographing/acquiring time points 720 for the images (e.g., configuring/changing in a cycle of 30 seconds).

In an embodiment, operation 660 may be omitted.

In an embodiment, operation 610 may be performed after operation 620 or between operations 620 and 630.

In an embodiment, at least one of operations 620, 630 and 640 may be omitted, and the order of operations 620, 630 and 640 may be arbitrarily configured.

In an embodiment, the electronic apparatus may activate/deactivate at least one component of the electronic apparatus based on at least in part on satisfaction/dissatisfaction of at least one of the first to third conditions.

In an embodiment, operation 610 may be performed after operation 620, and the electronic apparatus, if the first condition is satisfied, may activate (or change into a normal mode) at least one of inactive states (or sleep modes) of the camera, ISP, display, or processor or may reduce the activation/deactivation cycle. The electronic apparatus, if the first condition is not satisfied, may deactivate at least one of active states of the camera, ISP, display, or processor or may increase the activation/deactivation cycle.

In an embodiment, operation 620 may be performed after operation 630 or operation 640, and the electronic apparatus, if the second condition and/or the third condition is/are satisfied, may activate the sensor in an inactive state, or may reduce the activation/deactivation cycle. The electronic apparatus, if the second condition and/or the third condition is/are not satisfied, may deactivate the sensor in an active state or may increase the activation/deactivation cycle.

In an embodiment, the electronic apparatus, if at least one of the first to third conditions is satisfied, may activate the display in an inactive state. The electronic apparatus, if at least one of the first to third conditions is not satisfied, may deactivate the display in an active state.

For example, in a sleep mode or an inactive state, the corresponding device may be in a state in which it cannot perform at least a part of its function that could be performed in the normal mode or the activated state.

For example, in the normal mode or the active state, the camera may be in a power/display on state, a state of generating and/or displaying a preview image, or a state able to photograph an image. In the sleep mode or inactive state, the camera may be in a power/display off state, a state in which the preview image is not generated or not displayed, or a state in which the image cannot be photographed.

For example, in the normal mode or in the active state, the display may be in the power/display on state. In the sleep mode or inactive state, the display may be in the power/display off state.

Figure 8A:
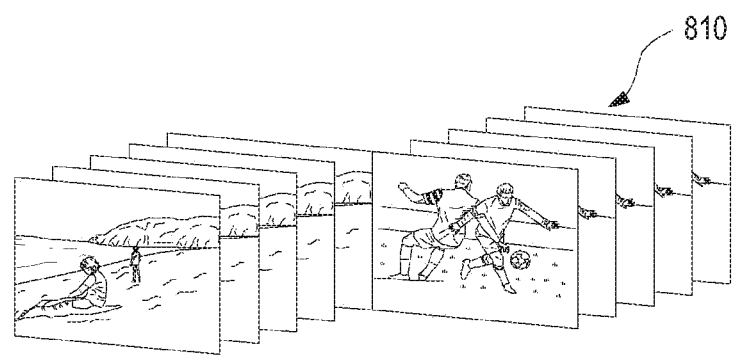
FIGS. 8A, 8B, and 8C are views illustrating a method of selecting a representative image of an electronic apparatus according to an embodiment of the present disclosure.
Figure 8B:
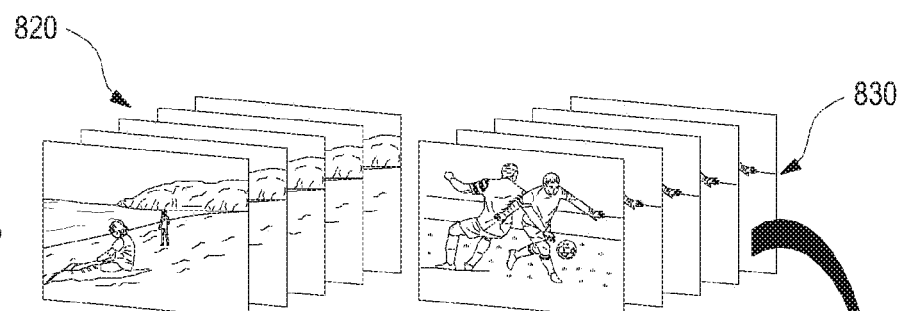
Figure 8C:
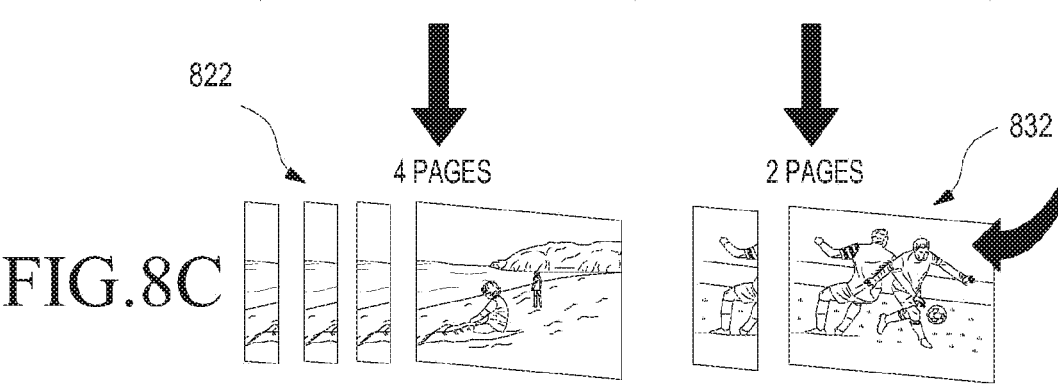

FIGS. 8A, 8B, and 8C are views illustrating a method of selecting a representative image of an electronic apparatus according to an embodiment of the present disclosure. The method of selecting a representative image of an electronic apparatus (e.g., electronic apparatus 101, 201, and 401) may be performed by at least one of the electronic apparatus, a control unit, and a processor (e.g., processors 120, 210, and 410) of the electronic apparatus.

Referring to FIG. 8A, the electronic apparatus may acquire/photograph multiple images 810.

Referring to FIG. 8B, the electronic apparatus may classify the multiple images 810 into images of a first group 820 corresponding to a first event type and images of a second group 830 corresponding to a second event type, based on at least in part on the types of events recognized for the scenes or subjects of the images.

Referring to FIG. 8C, the electronic apparatus may select at least one representative image for each group base at least in part on at least one of the total photographing time of the images of each group, the number/amount/size of one or more (or all) images in each group, or the type of event corresponding to each group. At least one of the number/amount/size, display/play time or display/play speed of one or more (or all) representative images of each group may be determined based on at least in part on (e.g., proportionally) at least one of the total photographing time of each group, the number/amount/size of one or more (or all) images, or the type of event corresponding to each group.

For example, the electronic apparatus may configure the number of the representative images 822 of the first group 820 to be four so as to be proportional to the total photographing time (e.g., two hours) of the images of the first group 820. The electronic apparatus may configure the number of the representative images 832 of the second group 830 to be two so as to be proportional to the total photographing time (e.g., one hour) of the images of the second group 830.

In an embodiment, the electronic apparatus may select/sample the representative images at a preconfigured time interval among the images of the respective groups.

In an embodiment, the electronic apparatus may select/sample images having a large difference with neighboring images among the images of each group as representative images.

In an embodiment, the electronic apparatus may allocate values representing a priority (or priority order) to each of the plurality of groups based on at least in part on the type of event corresponding to each group.

In an embodiment, the electronic apparatus, based on the priority allocated to each group, may configure so that at least one of the number/amount/size or display/play time of the entire representative images of the first group having a relatively high priority is greater (or longer) than that of the second group having a relatively lower priority.

For example, the electronic apparatus may allocate a higher priority to the first group 820 than to the second group 830 and configure the number of the representative images 822 of the first group 820 to be four and the number of the representative images 832 of the second group 830 to be two, according to the priorities of the first group 820 and second group 830.

Figure 9A:
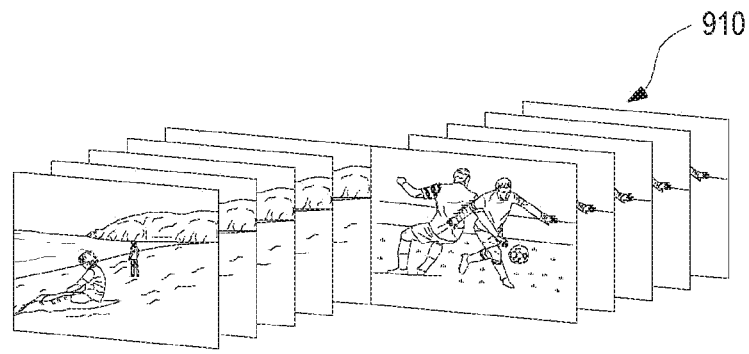
FIGS. 9A, 9B, and 9C are views illustrating a method of displaying/playing images of an electronic apparatus according to an embodiment of the present disclosure.
Figure 9B:
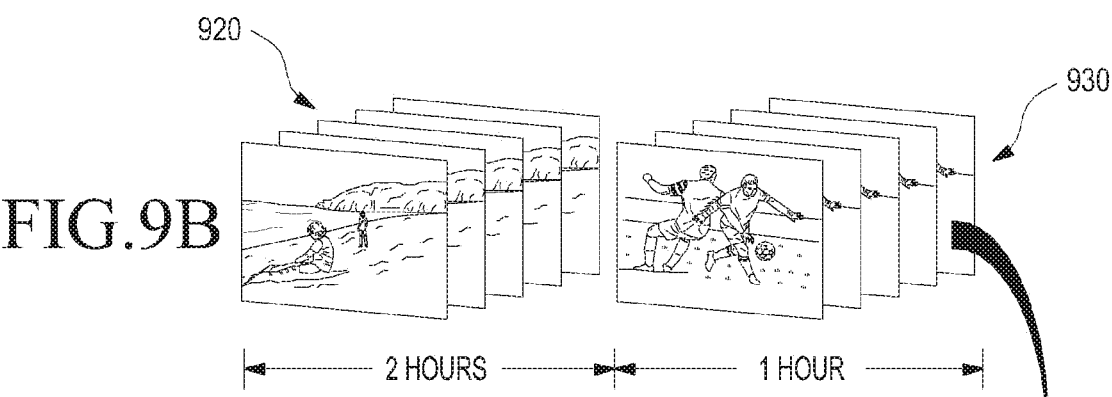
Figure 9C:
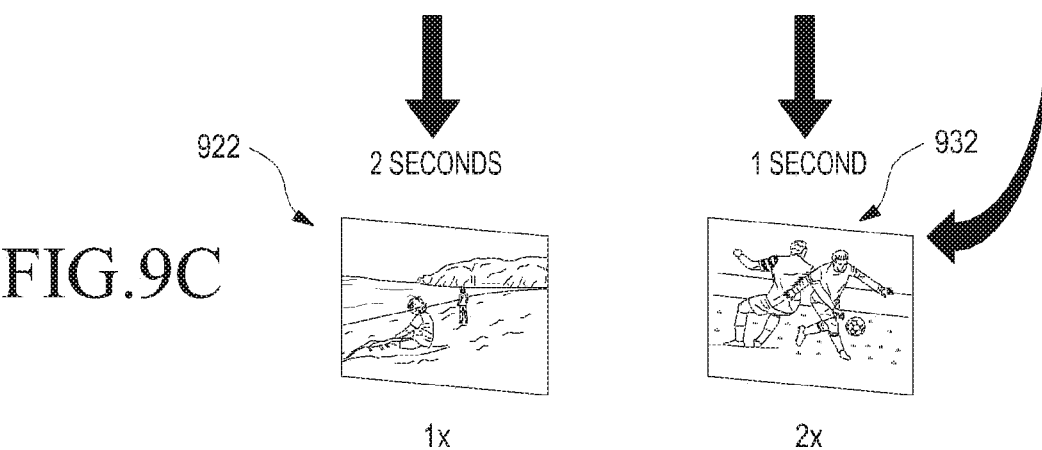

FIGS. 9A, 9B, and 9C are views illustrating a method of displaying/playing images of an electronic apparatus according to an embodiment of the present disclosure. The method of displaying/playing images of an electronic apparatus (e.g., electronic apparatus 101, 201, and 401) may be perform by at least one of a control unit or processors (e.g., processors 120, 210, and 410) of the electronic apparatus.

Referring to FIG. 9A, the electronic apparatus may acquire/photograph multiple images 910.

Referring to FIG. 9B, the electronic apparatus may classify the multiple images 910 into images of a first group 920 corresponding to a first event type and images of a second group 930 corresponding to a second event type, based on at least in part on the type of event recognized for the scene or the subject of the images.

Referring to FIG. 9C, the electronic apparatus may determine the number/amount/size/time/speed of display/play of the images of each group based on at least in part on at least one of the total photographing time of the images of each group, the number/amount/size of one or more (or all) images in each group, or the type of event corresponding to each group.

For example, the electronic apparatus may configure the play time of the images 922 of the first group 920 to be 2 seconds so as to be proportional to the total photographing time (e.g., two hours) of the images of the first group 920. The electronic apparatus may configure the play time of the images 932 of the second group 930 to be one second so as to be proportional to the total photographing time (e.g., one hour) of the images of the second group 930.

For example, the electronic apparatus may configure the play speed of the images 922 of the first group 920 to be a one-fold speed (1×) to be inversely proportional to the total photographing time (e.g., two hours) of the images of the first group 920. The electronic apparatus may configure the play speed of the images 932 of the second group 930 to be a twofold speed (2×) to be inversely proportional to the total photographing time (e.g., one hour) of the images of the second group 930.

In an embodiment, the electronic apparatus may determine the display/play number/amount/size/play speed of the images of each group based on at least in part on the user input for configuring the total play time of the multiple images 910 and the total photographing time of the images of each group.

For example, the electronic apparatus may configure the play time of the images 922 of the first group 920 to be 40 seconds based on at least in part on the total play time (e.g., one minute) of the multiple images 910 and the total photographing time (e.g., two hours) of the images 922 of the first group 920. The electronic apparatus may configure the play time of the images 932 of the second group 930 to be 20 seconds to be proportional to the total play time (e.g., one minute) of the multiple images 910 and total photographing time (e.g., one hour) of the images 932 of the second group 930.

For example, the electronic apparatus may configure the play speed of the images 922 of the first group 920 to be a twofold speed (2×) based on at least in part on the total play time (e.g., one minute) of the multiple images 910 and the total photographing time (e.g., two hours) of the images 922 of the first group 920. The electronic apparatus may configure the play speed of the images 932 of the images 932 of the second group 930 to be 4× based on at least in part on the total photographing time (e.g., one hour) of the images 932 of the first group 930.

In an embodiment, the electronic apparatus may allocate values representing a priority (or priority order) to each of the plurality of groups based on at least in part on the types of events corresponding to each group.

In an embodiment, the electronic apparatus, based on the priority allocated to each group, may configure such that the display/play number/amount/size/time of the images of the first group having a relatively high priority is greater (or longer) than that of the second group having a relatively lower priority.

For example, the electronic apparatus may allocate a higher priority to the first group 920 than to the second group 930 and configure the play time of the images 922 of the first group 920 to be two seconds and the play time of the images 932 of the second group 930 to be one second, according to the priorities of the first group 920 and second group 930.

For example, the electronic apparatus may allocate a higher priority to the first group 920 than to the second group 930 and configure the play speed of the images 922 of the first group 920 to be a one-fold speed (1×) and the play speed of the images 932 of the second group 930 to be a twofold speed (2×), according to the priorities of the first group 920 and second group 930.

Figure 10:
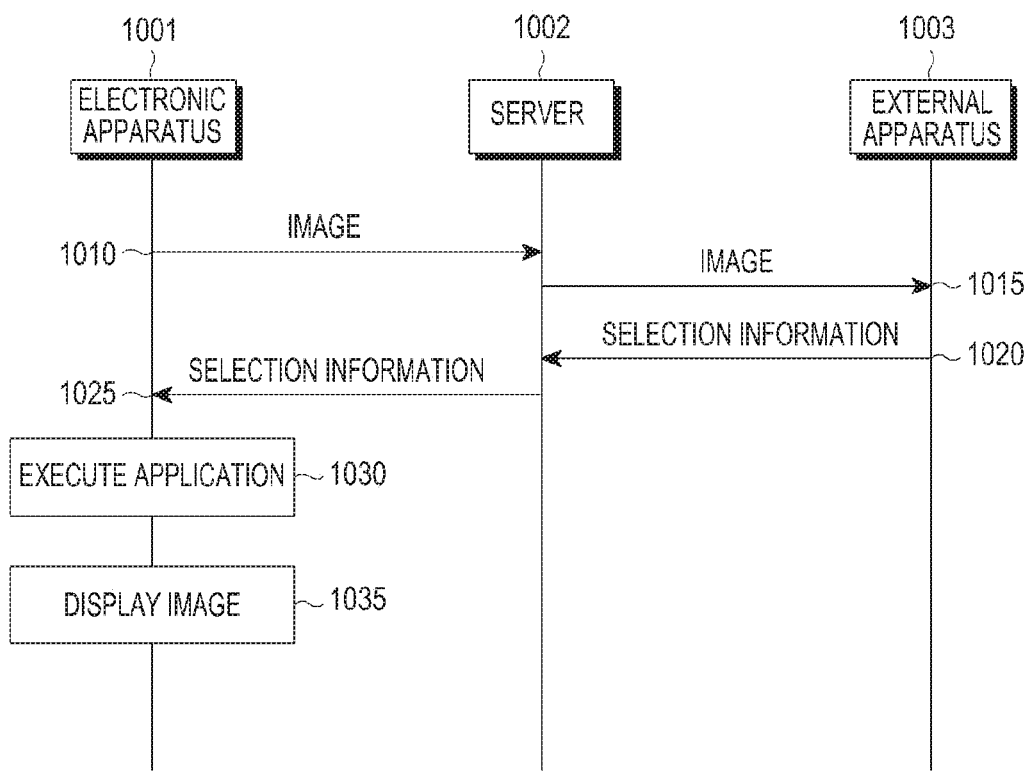
FIG. 10 is a flow chart illustrating a method of acquiring information associated with images of an electronic apparatus according to an embodiment of the present disclosure.

FIG. 10 is a flow chart illustrating a method of acquiring information associated with images of an electronic apparatus according to an embodiment of the present disclosure. The method of acquiring information associated with images of the electronic apparatus 1001 (e.g., electronic apparatuses 101, 201, 401) may include operations 1010 to 1035. The method of acquiring information associated with images of the electronic apparatus 1001 may be performed by at least one of a control unit or processors (e.g., processors 120, 210, 410) of the electronic apparatus 1001.

Referring to FIG. 10, in operation 1010, the electronic apparatus 1001 may transmit multiple images to a server 1002 (e.g., server 106) through a communication module (e.g., communication modules 170, 220, and 420) that is functionally connected to the electronic apparatus 1001. For example, the server 1002 may be a cloud server, and the electronic apparatus 1001 may periodically acquire/photograph images and periodically transmit the images to the server 1002.

In an embodiment, the multiple images may be transmitted to the server 1002 by a camera device. For example, the camera device may be attached to the body of user (e.g., a patient), may periodically photograph the images, and may transmit the photographed images to the server 1002.

In operation 1015, an external apparatus 1003 (e.g., a first external electronic apparatus 102, a second external electronic apparatus 104) may receive the multiple images stored in the server 1002.

In operation 1020, the external apparatus 1003 may transmit selection information according to a user input.

In an embodiment, the selection information may include selection information (i.e., image selection information) on at least one of the multiple images or may include image selection information and application information (or application selection information).

For example, a second user (e.g., a grandson of a patient) of the external apparatus 1003 may select at least one image to be displayed to a first user among the multiple images.

In operation 1025, the electronic apparatus 1001 may receive the selection information from the server 1002 through a communication module (e.g., communication modules 170, 220, and 420).

In operation 1030, the electronic apparatus 1001 may classify images corresponding to the selection information among the multiple images into groups, and may select and execute/activate an application (e. g., memory game) on which the images of the groups are displayed. Activation of the application represents a state selected to receive a user input.

In an embodiment, the group classification may be performed by an application for displaying images of the group.

In an embodiment, the electronic apparatus 1001 may execute/activate an application corresponding to the application information.

In operation 1035, the electronic apparatus 1001 may display the images of the groups selectively/sequentially/simultaneously on the application (or an application screen).

In an embodiment, the electronic apparatus 1001 may transmit the images of the groups selectively/sequentially/simultaneously to a display device (e.g., TV, smart phone, virtual reality (VR) device, augmented reality (AR) device, smart glass, smart watch, head-mounted display (HMD)).

In an embodiment, the electronic apparatus 1001 may transmit the application information to the display device with the images of the groups, or separately. For example, the display device may execute/activate an application corresponding to the application information, and may display the images of the groups selectively/sequentially/simultaneously on the application (or an application screen).

In an embodiment, the electronic apparatus 1001 may transmit the images (and application screen) of the groups to the display device through mirroring. For example, the electronic apparatus 1001 may transmit at least a part of the screen being displayed on the display (e. g., the display 160, 260, and 460) of the electronic apparatus 1001 or screen data corresponding to at least a part of the screen to the display device. The electronic apparatus 1001 may transmit the screen data in real time to the display device. In this manner, mirroring may mean that at least a part of the screen being displayed on the display of the electronic apparatus 1001 is received and displayed in real time by the display device.

In an embodiment, the electronic apparatus 1001 may convert at least a part of a screen displayed on the display or screen data corresponding to at least a part of the screen using the device information received from the display device, such as the size, aspect ratio (ration of vertical size and horizontal size), resolution, and image quality of the display device, and may transmit the converted screen data to the display device. Alternatively, such a conversion of the screen data may be performed in the display device. At this time, the screen refers to the visual image displayed on the display, and the screen data refers to arbitrary data that can constitute the screen. Such screen data may be image data, text data, application data, or the like. Alternatively, the screen data may be a raster image or a bitmap image of the screen being displayed on the display.

Figure 11:
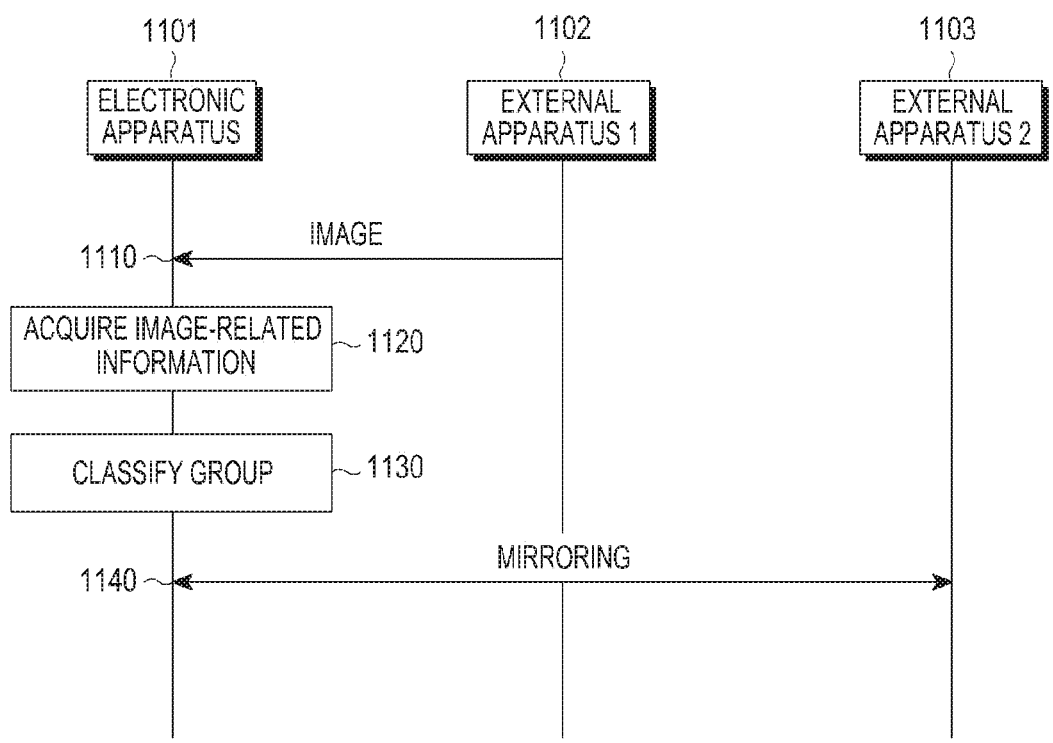
FIG. 11 is a flow chart illustrating a method of providing a service associated with images of an electronic apparatus according to an embodiment of the present disclosure.
Figure 12:
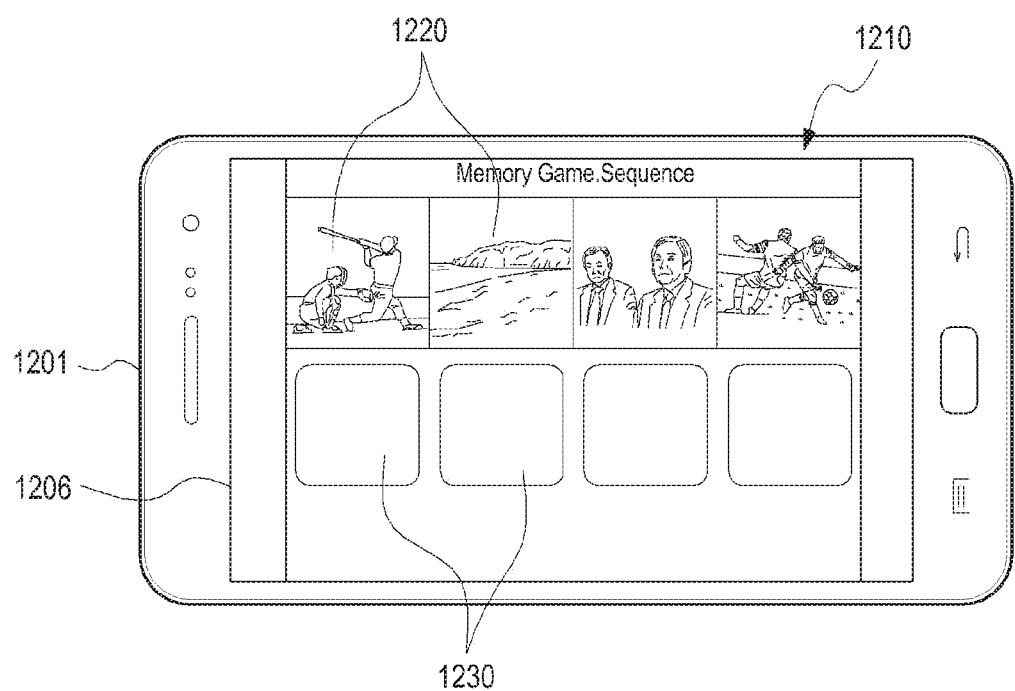
FIGS. 12 and 13 are views illustrating a method of providing a service associated with images of the electronic apparatus according to an embodiment of the present disclosure.
Figure 13:
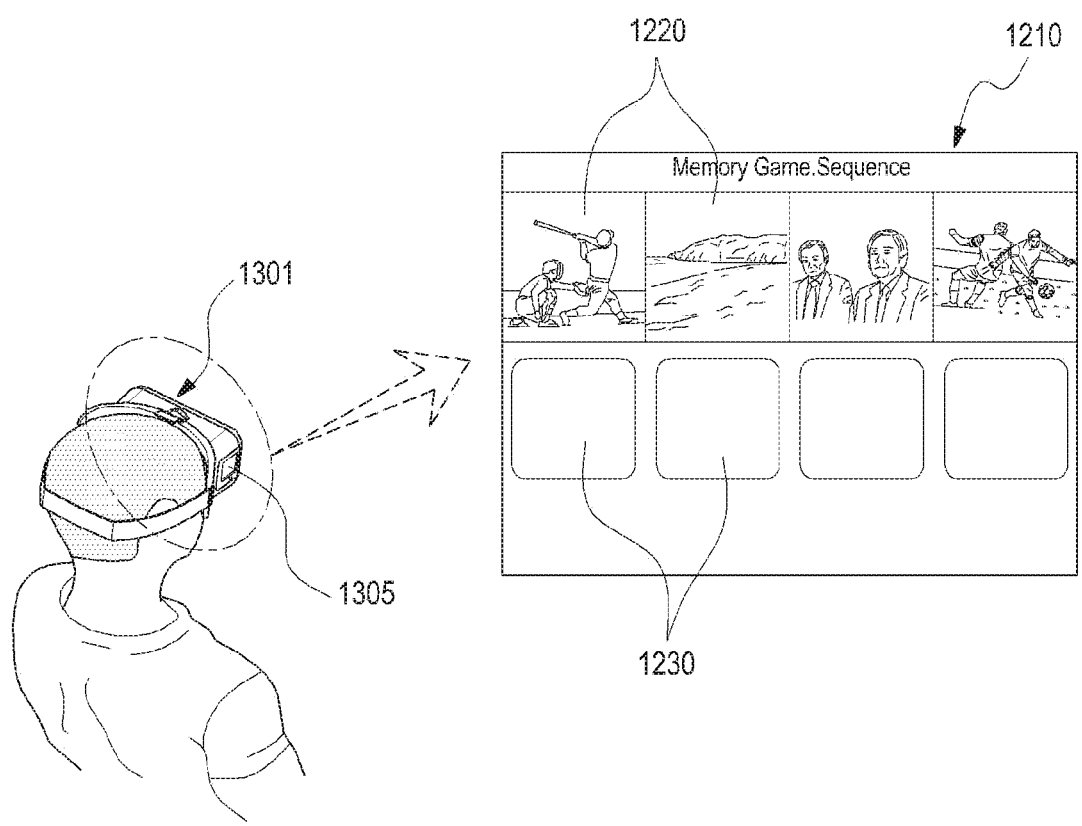

FIG. 11 is a flow chart illustrating a method of providing a service associated with images of an electronic apparatus according to an embodiment of the present disclosure, and FIGS. 12 and 13 are views illustrating a method of providing a service associated with images of the electronic apparatus according to an embodiment of the present disclosure.

Referring to FIG. 11, the method of providing a service associated with images of an electronic apparatus 1101 (e.g., electronic apparatuses 101, 201, and 401) may include operations 1110 to 1140. The method of providing a service associated with images of the electronic apparatus 1001 may be perform by at least one of the electronic apparatus 1101, or a control unit or processors (e.g., processors 120, 210, and 410) of the electronic apparatus 1101.

In operation 1110, the electronic apparatus 1101 may receive multiple images from a first external apparatus (e.g., a first external electronic apparatus 102, a second external electronic apparatus 104) through a communication module (e. g., communication modules 170, 220, and 420) that is functionally connected to the electronic apparatus 1101.

For example, the first external apparatus 1102 may be a camera device attached to a user's body, and may periodically photograph images and periodically transmit the photographed images to the electronic apparatus 1101.

In operation 1120, the electronic apparatus 1101 may perform acquiring information associated with at least one of the multiple images.

In an embodiment, the information associated with at least one of the multiple images may include situation information representing situation/status of the electronic apparatus 1101, a user's situation/status or photographing status/situation/condition, information on display/play number/time/frequency of at least one of the multiple images, information received from an external device, user input information, or information discovered using an external network.

In an embodiment, the situation information may include information on motion/status of the electronic apparatus 1101 or the user, information on the subject, information on the quality of the image, recognition information on the scene or subject of the image, information on a specific scene category/type of a specific subject/number of photographing/time/frequency for a specific subject, the type of event recognized for the scene or subject of the image, the disease/symptom/biometric information of the user, information on the current/photographing time, information on the position/location of the electronic apparatus 1101, and ambient sound.

In an embodiment, the recognition information may include at least one of identification information on a user included in the image, identification information on an object included the image, composition information of subjects included in the image, information on text included in the image, and color/saturation/brightness/luminosity information of an image.

In an embodiment, the electronic apparatus 1101 may recognize the information included in an image based on a first database (e. g., image-related information database 432) and/or a second database (e. g., target database 434) stored in a memory (e. g., memories 130, 230, and 430) that is functionally connected to the electronic apparatus.

In operation 1130, the electronic apparatus 1101 may perform classifying at least some of the multiple images into one group based on at least in part on the information associated with at least one of the multiple images.

In an embodiment, the electronic apparatus 1101 may classify at least some of the plurality of the images into at least one group according to the type of event recognized for the scene of each image or the subject. For example, the type of event may include at least one of breakfast, exercise, sport activities, outdoor/indoor wedding photographing, walking, lunch, watching TV, dinner, washing, sleeping, leisure activities, meeting/conversing with a friend, meeting/conversing with a new person, visiting a known place/new place, or the like.

In an embodiment, the electronic apparatus 1101 may classify at least some of the plurality of the images into at least one group based on type/identification information of the subject recognized for the scene or the subject of each image.

In an embodiment, the electronic apparatus 1101 may classify at least some of the multiple images based on at least in part on the user's disease/symptom/biometric information stored in the memory. For example, the electronic apparatus 1101 may classify images (e.g., representative images of important events) that help a user improve their memory capacity into a group based on the user's disease/symptom/biometric information.

In operation 1140, the electronic apparatus 1101 may perform mirroring for providing a service/function based on at least in part on the information on a classification of the images. For example, the electronic apparatus 1101 may select and execute/activate an application (e.g., memory game) on which the images of the groups are displayed.

In an embodiment, the electronic apparatus 1101 may transmit the images (and application screen) of the groups to the second external apparatus 1103 (e.g., a first external electronic apparatus 102, a second external electronic apparatus 104) through mirroring. For example, the second external apparatus 1103 may be one display device among TV, smart phone, VR, smart glass, smart watch, HMD.

For example, the electronic apparatus 1101 may transmit at least a part of a screen being displayed on a display (e.g., display 160, 260, and 460) of the electronic apparatus 1101 or screen data corresponding to at least a part of the screen to the first external apparatus 1102. The electronic apparatus 1101 may transmit the screen data in real time to the display device.

Referring to FIG. 12, an electronic apparatus 1201 (e.g., electronic apparatus 1101) may execute a memory game and display the screen 1210 of the memory game on a display 1206. The screen 1210 of the memory game may include groups of images 1220 classified from multiple images, according to a type of the subject/recognition information recognized for the scene or subject of each image. Each image 1220 of the groups may be moved to one of four areas 1230 according to a user input. The memory game may display a score allocated according to the number of images 1220 arranged in the area 1230 according to the photographing order.

Referring to FIG. 13, an external apparatus 1301 (e.g., second external apparatus 1103) may receive screen data corresponding to the screen 1210 of the memory game from the electronic apparatus 1201 through mirroring, and may display the screen 1210 of the memory game configured to the screen data. The external apparatus 1301 may receive a user input through a touch panel 1305, and may move one selected from the images 1220 of the groups into a selected one of the four areas (1230) according to the user input. For example, the user may drag to one of the four areas 1230 while touching one of the groups of images 1220 through the touch panel 1305.

In an embodiment, the external apparatus 1301 may transmit the user input received through the touch panel 1305 to the electronic apparatus 1201, and the electronic apparatus 1201 may update the screen 1210 of the memory game according to the user input and transmit screen data corresponding to the updated screen 1210 of the memory game to the external apparatus 1301 in real time. For example, the electronic apparatus 1201 and the external apparatus 1301 may display the screen 1210 of the same memory game at the same time through mirroring.

Figure 14:
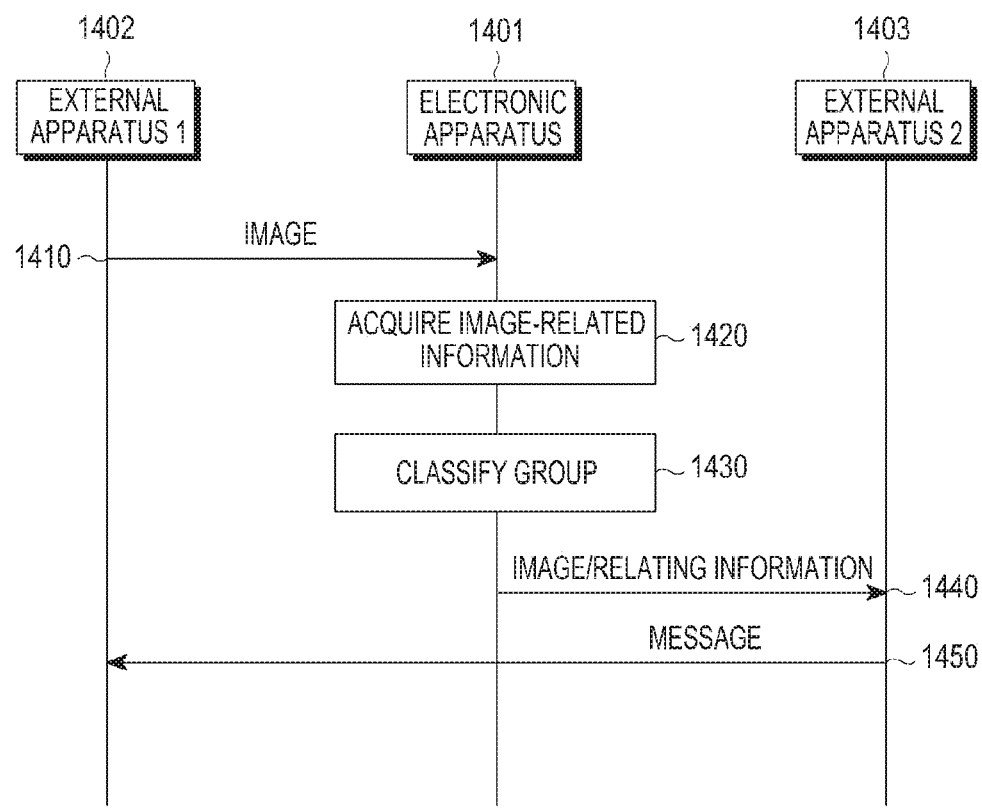
FIG. 14 is a flow chart illustrating a method of providing a service associated with images of an electronic apparatus according to an embodiment of the present disclosure.
Figure 15:
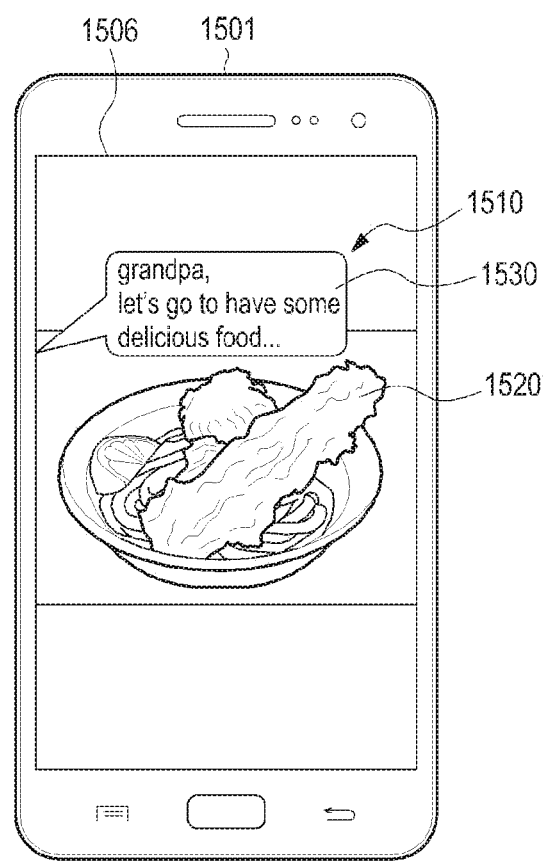
FIG. 15 and FIGS. 16A and 16B are views illustrating a method of providing a service associated with images of the electronic apparatus according to an embodiment of the present disclosure.
Figure 16A:
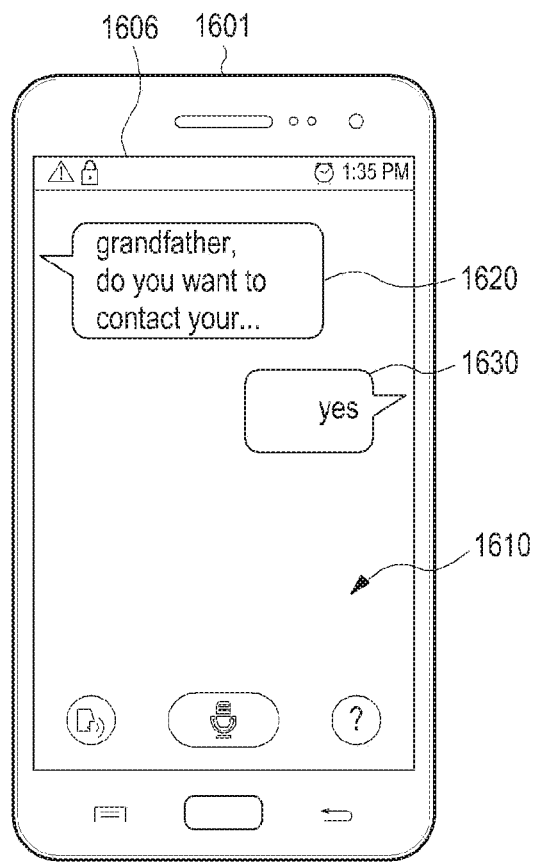
Figure 16B:
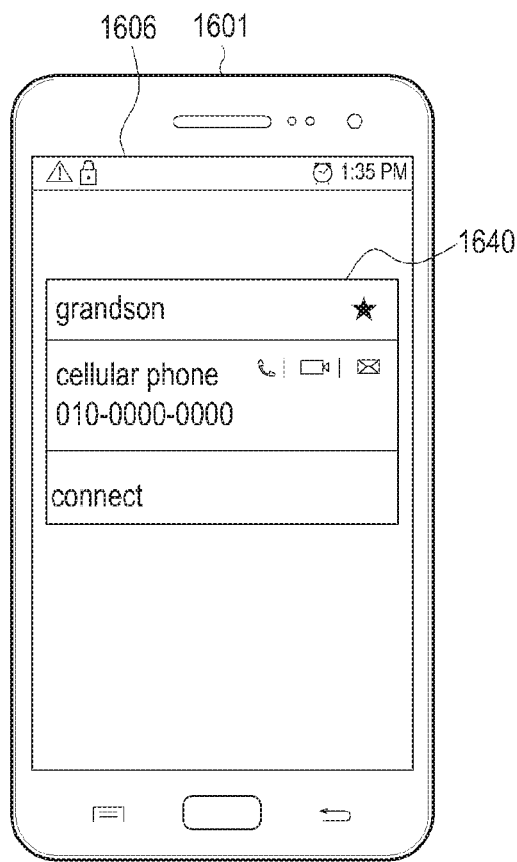

FIG. 14 is a flow chart illustrating a method of providing a service associated with images of an electronic apparatus according to an embodiment of the present disclosure, and FIG. 15 and FIGS. 16A and 16B are views illustrating a method of providing a service associated with images of the electronic apparatus, according to an embodiment of the present disclosure. The method of providing a service associated with images of the electronic apparatus 1401 (e.g., electronic apparatuses 101, 201, and 401) may include operations 1410 to 1450. The method of providing a service associated with images of the electronic apparatus 1401 may be performed by at least one of the electronic apparatus 1401, or a control unit or processor (e.g., processors 120, 210, 410) of the electronic apparatus 1401.

Referring to FIG. 14, in operation 1410, the electronic apparatus 1401 may receive multiple images from at least one of a first external apparatus 1402 (e.g., a first external electronic apparatus 102, a second external electronic apparatus 104) through a communication module (e.g., communication modules 170, 220, and 420) that is functionally connected to the electronic apparatus 1401. For example, the electronic apparatus 1401 may be a cloud server, and the electronic apparatus 1401 may periodically/aperiodically (e.g., when a new image is photographed by the at least one first external apparatus 1402) collect images photographed by at least one first external apparatus 1402.

In operation 1420, the electronic apparatus 1401 may perform acquiring information associated with at least one of the multiple images.

In an embodiment, the information associated with the multiple images may include at least one of situation information representing the situation/status of the electronic apparatus 1401, the situation/status of the user or photographing status/situation/condition, information on number/time/frequency of display/playback for at least one of the multiple images, information received from an external apparatus, user input information, or information discovered using an external network.

In an embodiment, the situation information may include information on motion/status of the electronic apparatus 1401 or the user, information on the subject, information on the quality of the image, recognition information on the scene or subject of the image, information on a specific scene category/kind of specific subject/number of photographing/time/frequency for a specific subject, the type of event recognized for the scene or subject of the image, the disease/symptom/biometric information of the user, information on the current/photographing time, information on the position/location of the electronic apparatus 401 and ambient sound.

In an embodiment, the recognition information may include at least one of identification information for a user included in the image, identification information for an object included in the image, composition information of the subjects included in the image, information on text included in the image, and color/saturation/luminosity/brightness information of the image.

In an embodiment, the electronic apparatus 1401 may recognize information included in the image on the basis of a first database (e.g., image-related information database 432) and/or a second database (e.g., target database 434) stored in a memory (e.g., memories 130, 230, and 430) that is functionally connected to the electronic apparatus 1401.

In operation 1430, the electronic apparatus 1401 may perform classifying at least some of the multiple images into at least one group based on at least in part on information associated with at least one of the multiple images.

In an embodiment, the electronic apparatus 1401 may classify at least some of the multiple images into one group according to information on the number/time/frequency of display/play for at least one of the multiple images and/or information on a specific scene category/type of a specific subject/photographing number/time/frequency for a specific subject.

In operation 1440, the electronic apparatus 1401 may transmit at least one image of the groups and/or information (e.g., number/time/frequency of display/play) associated with the group or the images in the group to the second external apparatus 1403 (e.g., the first external electronic apparatus 102, the second external electronic apparatus 104).

In an embodiment, the electronic apparatus 1401 may generate a message including the name of a subject included in the at least one image of the group, and may transmit the generated message (e.g., message "Grandfather has been looking at his grandson's photograph for five hours. Please contact him") to the second external apparatus 1403.

In operation 1450, the second external apparatus 1403 may transmit the message (e.g., text/image/voice message) by the user input to the first external apparatus 1402 or a third external apparatus (e.g., other apparatus owned by the user (e.g., a patient) of the first external apparatus 1402). For example, the user (e.g., grandson of the patient) of the second external apparatus 1403 may recognize an object (e.g., a hamburger) that the patient is currently interested in based on at least one image of the group and/or information associated with the group or an image in the group.

In an embodiment, the first external apparatus 1402 may transmit the images of the group selectively/sequentially/simultaneously to a display device (e.g., TV, smart phone, VR, smart glass, smart watch, HMD).

Referring to FIG. 15, the first external apparatus 1502 may display the message 1510 received from the second external apparatus 1403 to a display 1506. For example, the message 1510 may include at least one image 1520 of the group received from the electronic apparatus 1401 by the second external apparatus 1403 and/or a message content 1530 input by the user of the second external apparatus 1403.

In an embodiment, the first external apparatus 1402, 1501 may perform operations 1420, 1430 and 1440 instead of the electronic apparatus 1401. For example, the first external apparatus 1402, 1501 may generate a message including the name of the subject included in at least one of the images of the group, and transmit the generated message (e.g., message "Grandfather has been looking at his grandson's photograph for five hours. Please contact him") to the second external apparatus 1403.

In an embodiment, the first external apparatus 1402, 1501 may transmit, to the second external apparatus 1403, user information (e.g., disease/symptom/biometric information, information on location/place, etc.) with at least one image of the group and/or information (e.g., information on the number/time/frequency of photographing/display/play) associated with the group or images in the group, or instead of them.

Referring to FIG. 16A, a first external apparatus 1601 (e.g., a first external apparatus 1402) may generate a text 1620 including the name of the subject included in at least one image of the group, and display the generated text 1620 (e.g., message "Grandfather, do you want to contact your grandson?") to a display 1606.

In an embodiment, the first external apparatus 1601 may select at least one text element (e.g., "grandfather", "grandson", "hee-dong") of information associated with at least one image of the group, based on a database (e.g., image-related information database 432) defining a plurality of information/data elements and a relationship between the plurality of information/data elements (e.g., ontology of "[grandfather]-{goodwill}-[grandson]-{same person}-[hee-dong]"). The first external apparatus 1601 may display or transmit a graphic element (e.g., message "Grandfather, do you want to contact your grandson hee-dong?") including the selected at least one text element.

In an embodiment, the first external apparatus 1601 may combine at least one text element (e.g., "grandson") of the information associated with at least one image of the group, based on a plurality of information/data elements and a database (e.g., image-related information database) defining the relationship (ontology of "[grandfather]-{goodwill}-[grandson]-{same person}-[hee-dong]") between the plurality of information/data elements (e.g., "grandson hee-dong"). The first external apparatus 1601 may display the combination of the text elements or may store as information on the group or images of the group.

In an embodiment, the first external apparatus 1601 may automatically execute the voice recognition application 1610, generate a text 1620 including the name of the subject included in at least one image of the group, and display the generated text 1620 on the voice recognition application 1610. For example, the first external apparatus 1601 may convert the text 1620 into a voice to output.

The voice recognition application 1610 may recognize a user's voice (e.g., "yes"). The voice recognition application 1610 may convert the recognized voice into a text 1630 to display on the display 1606.

Referring to FIG. 16B, the voice recognition application 1610 may perform a function corresponding to a user's response 1630 (e.g., "yes") with respect to the automatically generated question in the text 1620 (e.g., "Grandfather, do you want to contact your grandson?"). For example, the voice recognition application 1610 may display the grandson's contact 1640 on the display 1606. For example, the voice recognition application 1610 may perform functions such as executing a call/message application or attempting a call connection, according to the user's response.

In an embodiment, the voice recognition application 1610 may recognize the name of the subject included in the at least one image of the group based on a target database (e.g., target database 434). The voice recognition application 1610 may select hee-dong's contact 1640 based on a database (e.g., Image-related information database 432) defining a plurality of information/data elements and a relationship between the plurality of information/data elements (e.g., ontology of "[grandfather]-{goodwill}-[grandson]-{same person}-[hee-dong]").

Figure 17A:
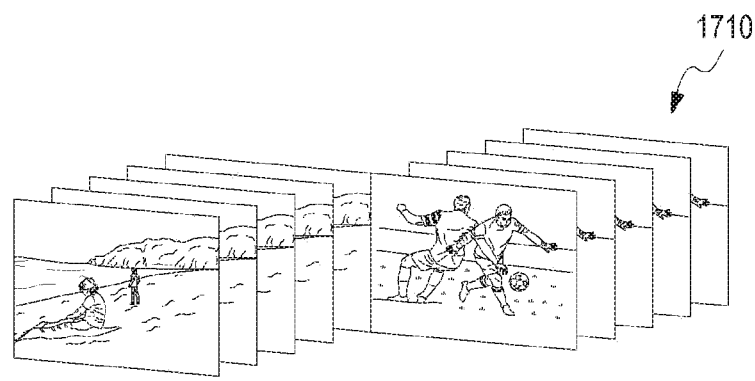
FIGS. 17A, 17B, and 17C are views illustrating a method of providing a service associated with images of an electronic apparatus according to an embodiment of the present disclosure.
Figure 17B:
Figure 17B:
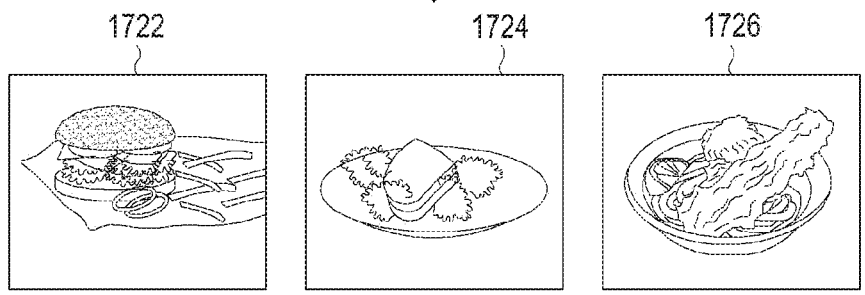
Figure 17C:
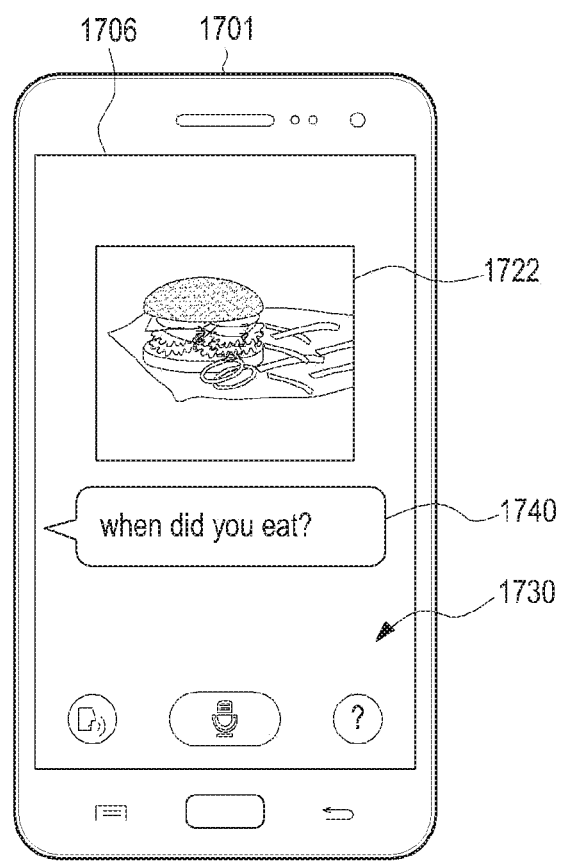

FIGS. 17A, 17B, and 17C are views illustrating a method of providing a service associated with images of an electronic apparatus according to an embodiment of the present disclosure.

Referring to FIG. 17A, an electronic apparatus 1701 (e.g., electronic apparatuses 101, 201, and 401) may acquire/photograph multiple images 1710.

Referring to FIG. 17B, the electronic apparatus 1701 may classify images (1722, 1724, and 1726) associated with food among the multiple images 1710 into one group.

Referring to FIG. 17C, the electronic apparatus 1701 may automatically execute a voice recognition application 1730, generate a text 1740 including the type/name of a subject included in the at least one image of the group, and display the generated text 1740 on a voice recognition application 1730. For example, the electronic apparatus 1701 may convert the generated text 1740 into a voice to output.

The voice recognition application 1730 may recognize the user's voice (e.g., "morning", "noon"). The voice recognition application 1730 may convert the recognized voice into a text to display on a display 1706 (e.g., display 160, 260, and 460).

The voice recognition application 1730 may display a result (e.g., incorrect, correct, correct answer, wrong answer, etc.) of comparing the user's response (e.g., "morning", "noon") to the generated text 1740 with information (e.g., time information such as morning, noon, evening, 11 o'clock, location information, etc.) associated with at least one image of the group on the display 1706.

Figure 18A:
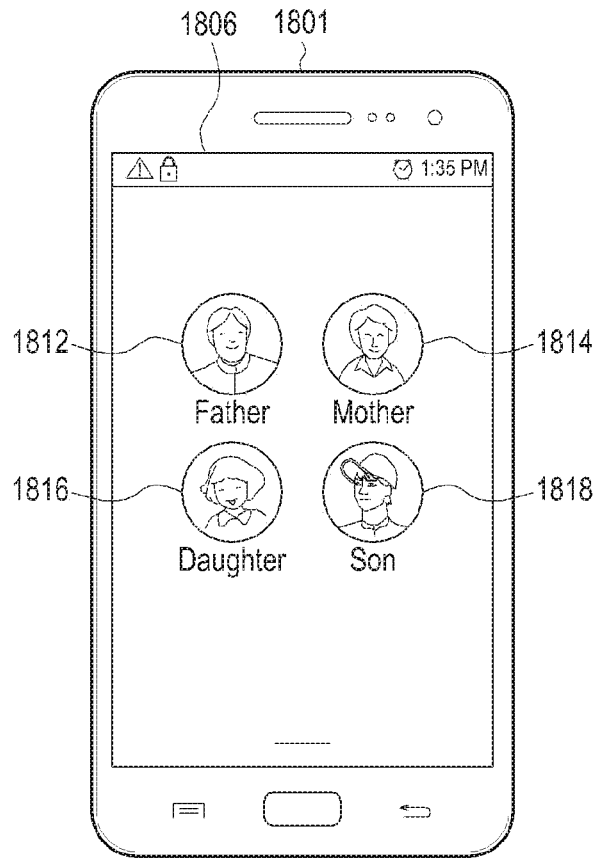
FIGS. 18A and 18B are views illustrating a method of providing a service associated with images of an electronic apparatus according to an embodiment of the present disclosure.
Figure 18B:
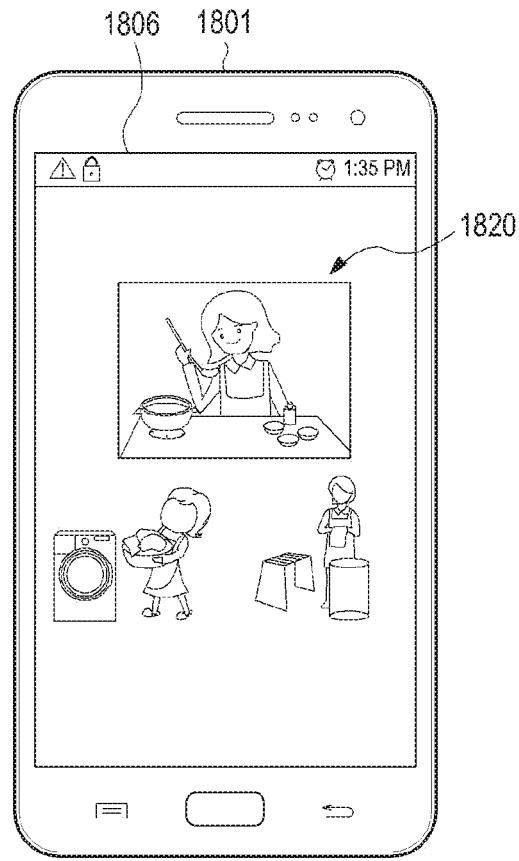

FIGS. 18A and 18B are views illustrating a method of providing a service associated with images of an electronic apparatus according to an embodiment of the present disclosure.

Referring to FIG. 18A, an electronic apparatus 1801 (e.g., electronic apparatuses 101, 201, and 401) may acquire/photograph multiple images, may recognize images including a preconfigured subject (e.g., user, user' face) among the multiple images based on a target database (e.g., target database 434), and may identify the recognized images of faces to classify a plurality of groups. The electronic apparatus 1801 may display representative images 1812, 1814, 1816, 1818 of the plurality of groups on a display 1806 (e.g., displays 160, 260, and 460). For example, the electronic apparatus 1801 may display a representative image 1812 of a first group corresponding to dad, a representative image 1814 of a second group corresponding to mom, a representative image 1816 of a third group corresponding to daughter, and a representative image 1818 of a fourth group corresponding to son.

Referring to FIG. 18B, the electronic apparatus 1801 may detect a selection with respect to one of representative images 1812, 1814, 1816, and 1818 among the multiple groups. The electronic apparatus 1801, in response to a detection for the selection, may display, on display 1806 the images 1820 of the group to which the representative image belongs. For example, the electronic apparatus 1801 may detect a user input for selecting the representative image 1814 of the second group, and display the images 1820 of the second group in response to the user input.

Figure 19:
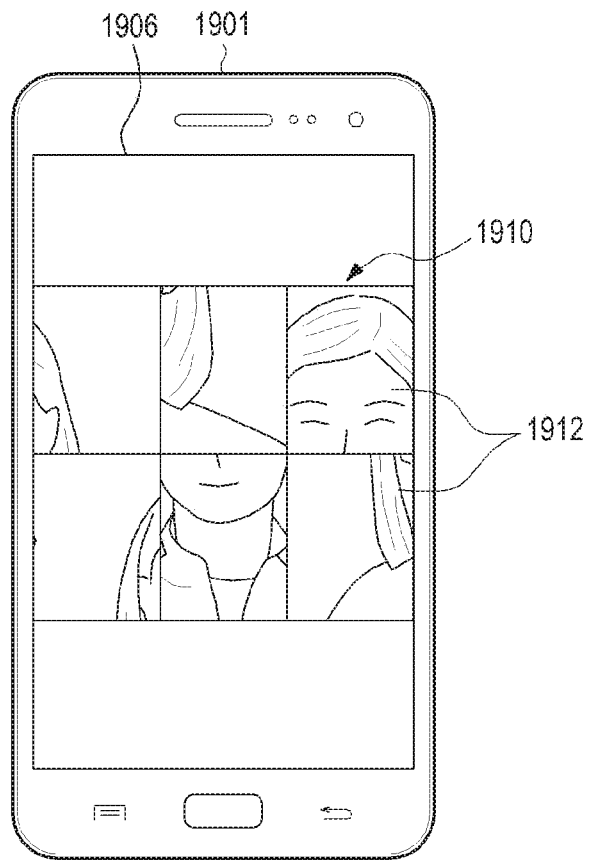
FIGS. 19, 20, and 21 are views illustrating a method of providing a service associated with images of an electronic apparatus according to an embodiment of the present disclosure.
Figure 20:
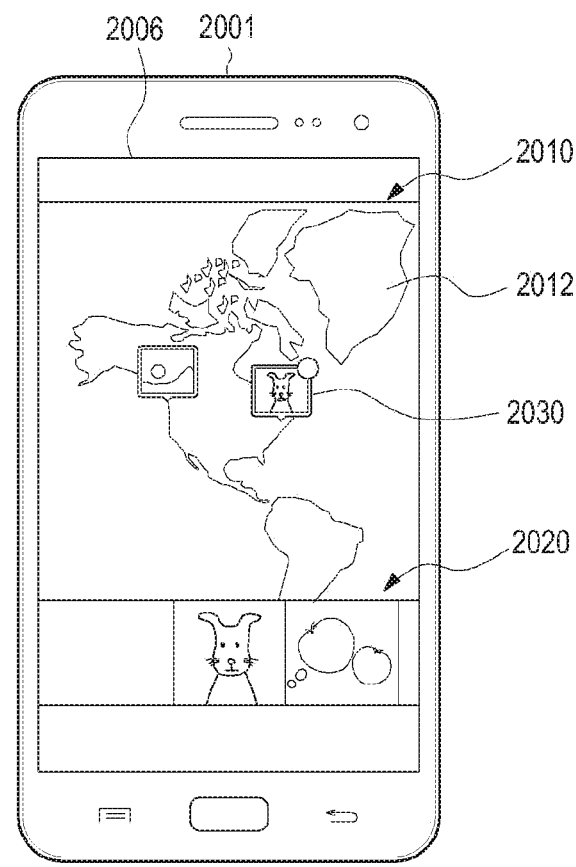
Figure 21:
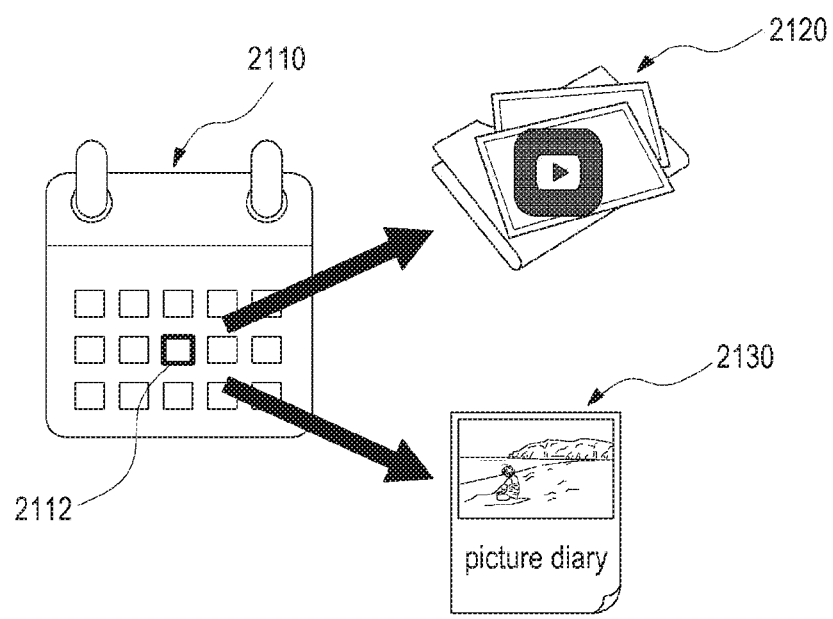

FIGS. 19, 20, and 21 are views illustrating a method of providing a service associated with images of an electronic apparatus according to an embodiment of the present disclosure.

Referring to FIG. 19, an electronic apparatus 1901 (e.g., electronic apparatuses 101, 201, and 401) may acquire/photograph multiple images, recognize at least one image including a preconfigured subject (e.g., user, user' face) among the multiple images on a target database (e.g., target database 434), and may classify the recognized at least one image into at least one group. The electronic apparatus 1901 may display a representative image 1910 of the group on a display 1906 (e.g., displays 160, 260, and 460). For example, the electronic apparatus 1901 may divide the representative image 1910 into multiple blocks 1912 to display, and may move each of the blocks 1912 according to a user input. The electronic apparatus 1901 may provide a game in which the user fits the original representative image 1910 through the movement of the blocks 1912.

Referring to FIG. 20, an electronic apparatus 2001 (e.g., electronic apparatuses 101, 201, and 401) may acquire/photograph multiple images, and may acquire information associated with the multiple images. For example, the electronic apparatus 2001 may detect situation information (e.g., at least one of photographing time, photographing location/place, ambient sound at a time of or while photographing) indicating photographing situation/state of images through a sensor (e.g., at least one of sensor 440, sensor module 240, touch panel 252, GNSS module 227, microphone 288) or a communication module (e.g., communication modules 170, 220, and 420).

In an embodiment, the electronic apparatus 2001 may classify the multiple images into multiple groups by country/region, based on at least in part on information associated with the multiple images.

In an embodiment, the electronic apparatus 2001 may execute a map application 2010 and may display at least some of the multiple images 2020 on the map application 2010 or display 2006 (e.g., display 160, 260, and 460). The electronic apparatus 2001, when one of at least some of the multiple images 2020 is selected, may map the selected image 2030 on the corresponding location/country/region on a map 2012 to display.

In an embodiment, the electronic apparatus 2001, when the location/country/region on the map 2012 is selected, may display images of the group corresponding to the selected location/country/region on the map application 2010 or the display 2006.

Referring to FIG. 21, an electronic apparatus (e.g., electronic apparatuses 101, 201, 401) may provide a service/function or acquire multiple images in conjunction with a schedule application 2110 (e.g., calendar application, schedule application).

For example, the electronic apparatus may determine the start time of photographing for the image 2120 based on at least in part on the schedule/event 2112 on the schedule application 2110.

For example, the electronic apparatus may classify the multiple images 2120 into at least one group base at least in part on the schedule/event 2112 on the schedule application 2110.

For example, the electronic apparatus may provide a function of creating a picture diary 2130 using images taken in associated with a date/schedule/event 2112 in conjunction with the date/schedule/event 2112 on the schedule application 2110. For example, the electronic apparatus may sort and display at least one group of images 2120 related to a date/schedule/event 2112 on a screen of the picture diary 2130 or the schedule application 2110 by date/time/schedule/event.

Figure 22:
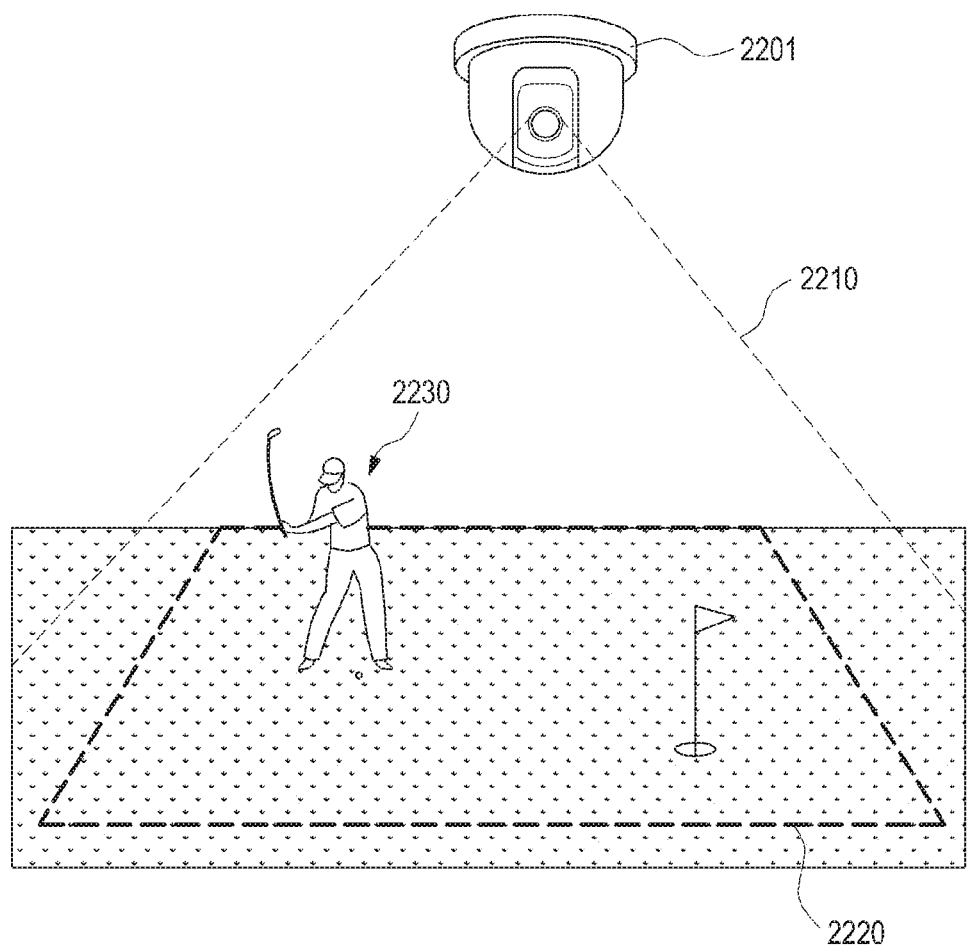
FIGS. 22 and 23 are views illustrating a method of acquiring images of an electronic apparatus according to an embodiment of the present disclosure.
Figure 23:
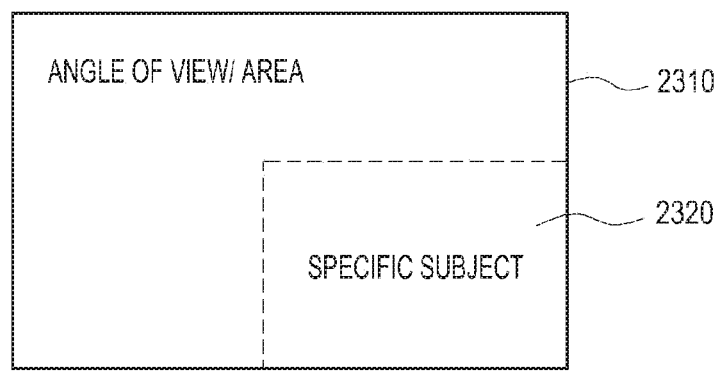

FIGS. 22 and 23 are views illustrating a method of acquiring images of an electronic apparatus according to an embodiment of the present disclosure.

Referring to FIG. 22, an electronic apparatus 2201 (e.g., electronic apparatuses 101, 201, 401) may detect a subject 2230 entering an angle of view 2210 or a preconfigured area 2220 within the angle of view 2210. The electronic apparatus 2201 may start/stop/postpone the photographing/acquiring of images, or adjust the photographing/acquiring interval for the images, in response to the detection of the subject 2230. For example, the electronic apparatus 2201 may start photographing or reduce the photographing interval in response to the detection of the subject 2230 entering the preconfigured area 2220, and may stop photographing for the image or increase the photographing interval if the subject 2230 moves out of the preconfigured area 2220. For example, the electronic apparatus 2201 may be a CCTV.

Referring to FIG. 23, an electronic apparatus (e.g., electronic apparatuses 101, 201, and 401) may detect a subject 2230 having a size larger than a preconfigured size in an angle of view or a preconfigured area 2310. The electronic apparatus may start/stop/postpone photographing/acquiring for images, or may adjust the photographing/acquiring interval for the images in response to detection of the subject 2320. For example, the electronic apparatus may be a black box of a transportation means such as a car/airplane, and the subject 2320 may be a preconfigured subject such as a license plate, a traffic light, a traffic sign, or the like. For example, the electronic apparatus may start photographing for the images or reduce a photographing interval when a subject 2320 having a size equal to or greater than a preconfigured threshold ratio is detected based on a view angle or a preconfigured size, and may stop the photographing or increase the photographing interval when the size of the subject 2320 becomes reduced below the preconfigured threshold ratio.

Figure 24:
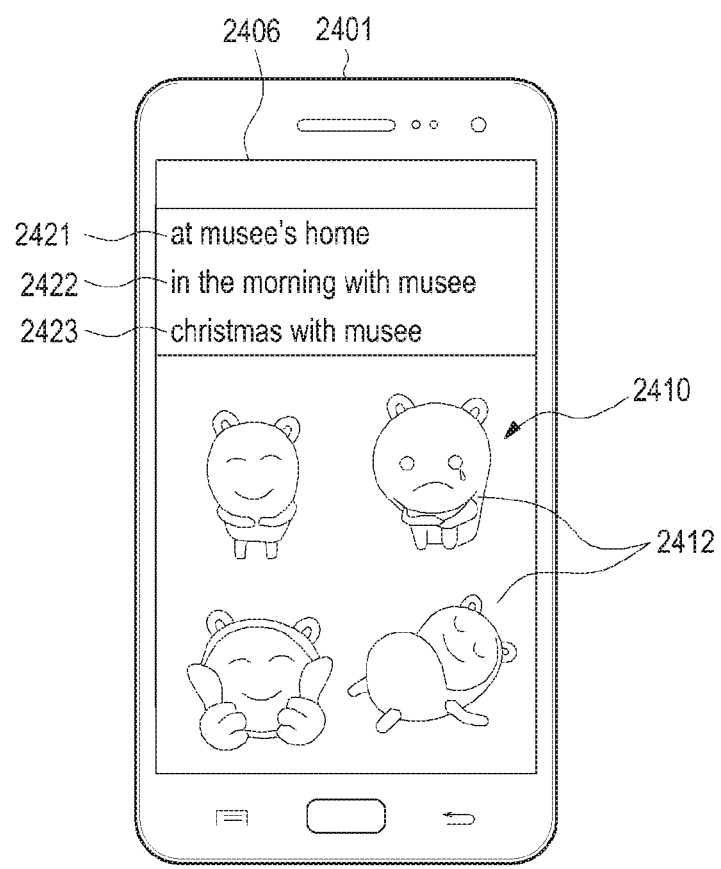
FIGS. 24, 25, and 26 are views illustrating a method of determining the title/category of a story album of an electronic apparatus according to an embodiment of the present disclosure.
Figures 25, 26:
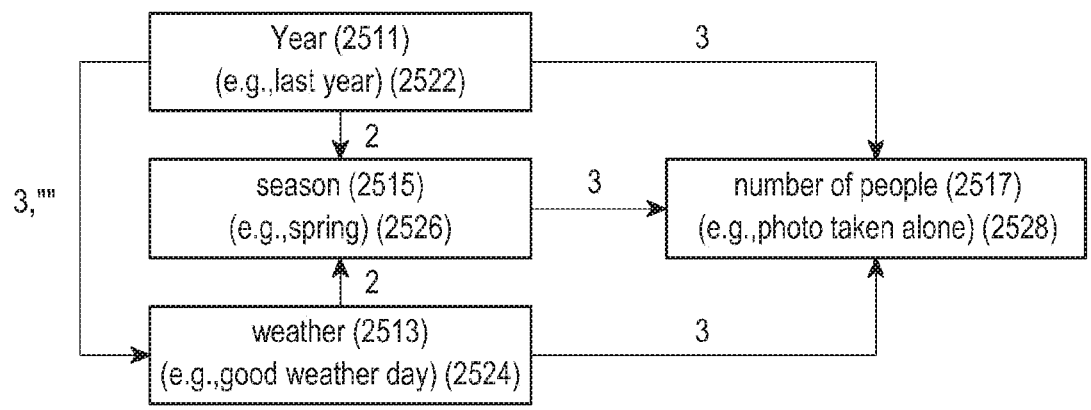

FIGS. 24, 25, and 26 are views illustrating a method of determining title/category of a story album of an electronic apparatus according to an embodiment of the present disclosure. The method of determining a title/category of a story album of an electronic apparatus 2401 (e.g., electronic apparatuses 101, 201, and 401) may be performed by at least one of the electronic apparatus 2401, or a control unit or a processor (e.g., processors 120, 210, and 410) of electronic apparatus 2401.

Referring to FIG. 24, the electronic apparatus 2401, based on at least in part on at least one of multiple images, may classify the multiple images into at least one group or a story album 2410. The electronic apparatus 2401 may combine the text elements of the information associated with at least one image 2412 of the story album 2410 based on a plurality of information/data elements and a database (e.g., image-related information database 432) that defines the relationship between the plurality of information/database elements.

In an embodiment, the electronic apparatus 2401 may display the combinations 2421, 2422, and 2423 of the text elements on a display 2406 (e.g., displays 160, 260, and 460). The electronic apparatus 2401 may configure the combination selected by a user input among combinations 2421, 2422, and 2423 of the text elements as a title/category of the story album 2410.

In an embodiment, the electronic apparatus 2401 may automatically select one of the combinations 2421, 2422, and 2423, and may configure the selected combination as the title/category of the story album 2410.

Referring to FIG. 25, the electronic apparatus 2401 may combine the text elements 2522 to 2528 of meta data for images stored in a memory (e.g., memories 130, 230, and 430) that is functionally connected to the electronic apparatus 2401 or an image-related information database (e.g., image-related information database 432), based on a plurality of information/data elements 2511 to 2528 and a database (e.g., image-related information database 432) that defines the relationship between the plurality of information/data elements 2511 to 2528.

For example, the database may include a plurality of categories/topics/classes 2511 to 2517, and text elements 2522 to 2528 included in each category/topic/class 2511 to 2517. In addition, the database may include the relationships of the plurality of categories/topics/classes 2511 to 2517 and weights for the relationships. For example, the plurality of categories/topics/classes 2511 to 2517 may include year 2511, weather 2513, season 2515, and number of people 2517, and the text elements 2522 to 2528 may include last year 2522, good weather day 2524, spring 2526 and alone 2528 (or photo taken alone). For example, a weight of 3 may be configured for a relationship between year 2511 and weather 2513, a relationship between year 2511 and number of people 2517, a relationship between weather 2513 and number of people 2517, a relationship between season 2515 and number of people 2517, and a weight of 2 may be configured for a relationship between year 2511 and season 2515 and a relationship between weather 2513 and season 2515.

Referring to FIG. 26, the electronic apparatus 2401 may compare the evaluation values for each of the combinations 2632 to 2638 of the text elements 2522 to 2528. For example, the evaluation values of the combinations 2632 to 2638 may be determined by summing the relationship weight(s) of the text elements 2522 to 2528 included in each combination. For example, the evaluation value for a photo 2632 taken alone last year may be 3, the evaluation value for a photo 2634 taken alone last spring may be 5, the evaluation value for a photo 2636 taken alone on a good weather day last year may be 6, and the evaluation value for a photo 2638 taken alone on a good weather day in the spring of last year may be 8.

The electronic apparatus 2401 may determine one of the combinations 2632 to 2638 of the text elements 2522 to 2528 as the title/category of the story album 2410 based on the comparison. For example, the electronic apparatus 2401 may determine a combination having the highest evaluation value among the combinations 2632 to 2638, that is, a photograph 2638 taken alone on a good weather day in the spring last year as the title/category of the story album 2410.

In an embodiment, the electronic apparatus 2401 may display the combinations 2632 to 2638 (and the image) on the display 2406, and may determine a selected combination as a title/category of the story album 2410 according to a user input selecting one of the combinations 2632 to 2638.

In various embodiments, through effective image checking and adjustment of a photographing interval for each event, memory/operation resources can be efficiently used, thereby enabling effective and convenient life-logging and story album production.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a non-transitory computer-readable storage medium in a programming module form. The instruction, when executed by a processor (e.g., the processor 120), may cause the one or more processors to execute the function corresponding to the instruction. The non-transitory computer-readable storage medium may be, for example, the memory 130.

The non-transitory computer-readable storage medium may include a hard disk, a floppy disk, magnetic media (e.g., a magnetic tape), optical media (e.g., a compact disc ROM (CD-ROM) and a DVD), magneto-optical media (e.g., a floptical disk), a hardware device (e.g., a ROM, a RAM, a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

In various embodiments, in the non-transitory computer-readable storage medium storing instructions, the instructions, when executed by at least one processor, cause the at least one processor to perform at least one operation, wherein the at least one operation includes: acquiring multiple images; acquiring information associated with at least one of the multiple images; classifying at least some of the multiple images into at least one group based on the information associated with the at least one of the multiple images; and providing a service/function, based on information of the classification of the at least some of the multiple images.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic apparatus for providing a service associated with images, the electronic apparatus comprising:
a memory; and
a processor configured to:
acquire, at a first photographing interval, first images including at least one subject corresponding to at least one predetermined object,
identify at least one of a first value representing a motion of the electronic apparatus or a second value representing a quality of the first images,
identify a second photographing interval based on the at least one of the first value or the second value,
acquire second images at the second photographing interval, and
provide a service, based on second information of at least some of the first images or the second images,
wherein the at least some of the first images or the second images are classified into at least one group based on the second information.

2. The electronic apparatus of claim 1, wherein the processor is further configured to:
identify a value smaller than the first photographing interval as the second photographing interval when the first value is smaller than a first threshold or when the second value is equal to or larger than a second threshold.

3. The electronic apparatus of claim 1, wherein the processor is further configured to:
identify a value larger than the first photographing interval as the second photographing interval when the first value is larger than or equal to a first threshold or when the second value is smaller than a second threshold.

4. The electronic apparatus of claim 1, wherein the processor is further configured to:
compare at least one of the first value or the second value with at least one condition preconfigured in the electronic apparatus, and
activate or deactivate at least one component of the electronic apparatus, based on the comparison.

5. The electronic apparatus of claim 1, wherein the processor is further configured to:
detect a subject entering an angle of view of a camera that is functionally connected to the electronic apparatus or a preconfigured area within the angle of view, and start acquiring the second images or adjust the second photographing interval in response to detecting the subject.

6. The electronic apparatus of claim 1, wherein the processor is further configured to:
   detect a subject having a size larger than a preconfigured size through a camera that is functionally connected to the electronic apparatus, and
   start acquiring the second images or adjust the second photographing interval in response to detection of the subject.

7. The electronic apparatus of claim 1, wherein the processor is further configured to:
   select at least one representative image for each group of the at least one group, based on at least one of a total photographing time of the second images of each group, a total number of images of each group, a type of event corresponding to each group, or a user input, and
   display the at least one representative image.

8. The electronic apparatus of claim 1,
   wherein the processor is further configured to sequentially play the second images of the at least one group, and
   wherein at least one of a playing time or a playing speed of the second images of each group is identified based on at least one of a total photographing time of the second images of each group, a total number of images of each group, a type of event corresponding to each group, or a user input.

9. The electronic apparatus of claim 1, wherein the processor is further configured to:
   display a graphic element generated based on at least one image of the at least one group, and information associated with the at least one image,
   receive a response for the graphic element, and
   display a comparison result of the information associated with the at least one image and the response.

10. A method of providing a service associated with images in an electronic apparatus, the method comprising:
    acquiring, at a first photographing interval, first images including at least one subject corresponding to at least one predetermined object;
    identifying at least one of a first value representing a motion of the electronic apparatus or a second value representing a quality of the first images,
    identifying a second photographing interval based on the at least one of the first value or the second value,
    acquiring second images, at the second photographing interval; and
    providing a service based on second information of at least some of the first images or the second images,
    wherein the at least some of the first images or the second images are classified into at least one group based on the second information.

11. The method of claim 10, wherein the identifying of the second photographing interval comprises:
    identifying a value smaller than the first photographing interval as the second photographing interval when the first value is smaller than a first threshold or when the second value is equal to or larger than a second threshold.

12. The method of claim 10, wherein the identifying of the second photographing interval comprises:
    identifying a value larger than the first photographing interval as the second photographing interval when the first value is larger than or equal to a first threshold or when the second value is smaller than a second threshold.

13. The method of claim 10, further comprising:
    identifying at least one of a playing time or a playing speed of the second images of each group, based on at least one of a total photographing time of images of each group, a total number of images of each group, a type of event corresponding to each group, or a user input,
    wherein the providing of the service comprises sequentially playing images of the at least one group.

14. A non-transitory computer-readable storage medium storing instructions configured to cause at least one processor to perform at least one operation when the instructions are executed by the at least one processor, wherein the at least one operation comprises:
    acquiring, at a first photographing interval, first images including at least one subject corresponding to at least one predetermined object;
    identifying at least one of a first value representing a motion of an electronic apparatus or a second value representing a quality of the first images,
    identifying a second photographing interval based on the at least one of the first value or the second value,
    acquiring second images at the second photographing interval; and
    providing a service based on second information on at least some of the first images or the second images,
    wherein the at least some of the first images or the second images are classified into at least one group based on the second information.

15. The non-transitory computer-readable storage medium of claim 14, wherein the identifying of the second photographing interval comprises:
    identifying a value smaller than the first photographing interval as the second photographing interval when the first value is smaller than a first threshold or when the second value is equal to or larger than a second threshold.

16. The non-transitory computer-readable storage medium of claim 14, wherein the identifying of the second photographing interval comprises:
    identifying a value larger than the first photographing interval as the second photographing interval when the first value is larger than or equal to a first threshold or when the second value is smaller than a second threshold.

17. The non-transitory computer-readable storage medium of claim 14,
    wherein the providing of the service comprises sequentially playing the second images of the at least one group, and
    wherein at least one of a playing time or a playing speed of the second images of each group of the at least one group is identified, based on at least one of a total photographing time of images of each group, a total number of images of each group, a type of event corresponding to each group, or a user input.

18. The non-transitory computer-readable storage medium of claim 14, wherein the providing of the service comprises:
    recognizing a subject of the at least one of the first images, and prompting a user, based on the recognition of the subject, to perform at least one of messaging the subject or attempting a call connection to the subject.

\* \* \* \* \*